United States Patent
Copeland et al.

(10) Patent No.: US 12,217,261 B2
(45) Date of Patent: Feb. 4, 2025

(54) SYSTEM FOR ACCESSING NON-FUNGIBLE TOKENS

(71) Applicant: TouchNFT, LLC, Westfield, IN (US)

(72) Inventors: Joseph Copeland, Westfield, IN (US); Tamba Samba, Indianapolis, IN (US)

(73) Assignee: Touch NFT, LLC, Westfield, IN (US)

( * ) Notice: Subject to any disclaimer, the term of this patent is extended or adjusted under 35 U.S.C. 154(b) by 109 days.

(21) Appl. No.: 17/655,570

(22) Filed: Mar. 21, 2022

(65) Prior Publication Data

US 2023/0085677 A1    Mar. 23, 2023

Related U.S. Application Data

(60) Provisional application No. 63/246,390, filed on Sep. 21, 2021.

(51) Int. Cl.
G06Q 20/40        (2012.01)
G06F 21/10        (2013.01)

(52) U.S. Cl.
CPC ..... *G06Q 20/4015* (2020.05); *G06F 21/1015* (2023.08); *G06Q 2220/00* (2013.01)

(58) Field of Classification Search
None
See application file for complete search history.

(56) References Cited

U.S. PATENT DOCUMENTS

| | | | | |
|---|---|---|---|---|
| 11,182,467 B1 * | 11/2021 | Medina | .................. | G06F 3/147 |
| 11,605,062 B2 * | 3/2023 | Prakash | .............. | G06Q 20/326 |
| 2020/0053081 A1 | 2/2020 | Park et al. | | |
| 2020/0184041 A1 | 6/2020 | Andon et al. | | |
| 2021/0201336 A1 | 7/2021 | Mallett et al. | | |
| 2022/0391895 A1 * | 12/2022 | Weber | ................ | G06Q 20/3823 |
| 2023/0062776 A1 * | 3/2023 | Vosseller | ............. | G06Q 30/018 |
| 2023/0070389 A1 * | 3/2023 | Madhusudhan | .... | G06Q 20/3276 |
| 2023/0092012 A1 * | 3/2023 | Matthews | .......... | G06Q 20/0658 |

FOREIGN PATENT DOCUMENTS

| | | | | | |
|---|---|---|---|---|---|
| JP | 2023007937 A | * | 1/2023 | ............. | G06Q 20/36 |
| WO | WO 2021/140460 | | 7/2021 | | |

OTHER PUBLICATIONS

Matthieu, N., et al., "Mapping the NFT revolution: market trends, trade networks, and visual features", Scientific Reports (Nature Publisher Group) 11.1London: Nature Publishing Group. (2021) (Year: 2021).*

* cited by examiner

*Primary Examiner* — Clay C Lee
(74) *Attorney, Agent, or Firm* — Quarles & Brady LLP

(57) ABSTRACT

A system that allows owners of Non Fungible Tokens (NFTs) to access an NFT via a physical item. The physical item may include authenticating information that enables the system to verify ownership of an NFT that is maintained in a remote database, such as a blockchain ledger. The item thus enables the owner to quickly and securely access the digital asset associated with the NFT via a reader, such as a smart phone or other computing device. The system provides a method for binding an NFT to the physical item, and a corresponding method for accessing the NFT and the related digital asset later using the physical item.

24 Claims, 8 Drawing Sheets

SYSTEM FOR ACCESSING NON-FUNGIBLE TOKENS

CROSS REFERENCE TO RELATED APPLICATIONS

This application is a continuation of U.S. Provisional Application No. 63/246,390 filed Sep. 21, 2021, which is hereby incorporated by reference in its entirety.

BACKGROUND

Today people are able to buy Non-Fungible Tokens ("NFTs") that certify ownership of an asset, and this ownership is recorded for future reference, usually on a publicly accessible distributed ledger such as a blockchain. The item associated with the NFT may be a physical item such as shoes, clothing, or other tangible objects, or the item may be digital content such as raw files (mp4, jpgs, gifs, .mov, etc.). These files may be cumbersome or confusing to access and manage. Wallet apps are available but are merely storage mechanisms that can be complicated and are not designed for sharing or enjoying digital files such as music, videos, or documents.

SUMMARY

The system of the present disclosure creates a more complete NFT experience by giving owners access to digital files via a physical token such as a Near Field Communication ("NFC") enabled card or chip which may be embedded in any physical object. This system allows artists to distribute their work directly to fans without using intermediaries such as Spotify, Google Play, or Apple Music, whose fees reduce the opportunity for artists to receive the full benefit of their works. The disclosed system also gives NFT owners physical access to their digital content. NFT owners may thus be provided both tangible proof of NFT ownership, and quick access to the NFT content they own. Users are also not required to download and manage yet another music app.

The disclosed system also reinvigorates the collectible nature of music without losing the benefits of digital distribution. The system of the present disclosure creates and maintains a relationship between a physical object and digital media associated with the object such that the physical object can be separately collected as a collector's item, while the digital media can also be experienced anywhere an access token can be read (e.g. via a smart phone).

In another aspect, the disclosed system provides for a way for NFT owners to share their NFTs with others without direct access to a digital wallet application. In another aspect, the system creates additional security for the creator of the original NFT so the NFT can be accessed by authentic owners only, which prevents the possibility of diluting the collectible value of the NFT.

Disclosed is a system that allows owners of NFTs to access an NFT via a physical token referred to here as an "access token", or "certificate of authenticity". The access token may include an access key, identifier, or other authentication information that enables the system to verify NFT ownership of an NFT that is accessible via a remote database, such as a blockchain ledger. The token thus enables the owner to quickly and securely access the content(s) of the NFT via a reader, such as a smart phone or other computing device.

The system of the present disclosure optionally includes an access token configured to retain access control data for a Non-Fungible Token (NFT) that includes an NFT identifier for uniquely identifying an NFT, and verification data specific to the NFT identifier. An access control system is optionally configured to compare the verification data obtained from the access token with access control data that may be maintained in an access control database, on a blockchain ledger, or other database, accessible by the access control system. In another aspect, the access control system may be configured to deny access to an NFT, for example, when the verification obtained from the access token data does not match the access control data in the access control database for the NFT identified by the NFT identifier.

The disclosed system may also include a token reader. The token reader is optionally responsive to the access token and may be configured to obtain the access control data from the access token. In another aspect, the token reader may be in communication with the access control system via a computer network and is optionally operable to provide access to an NFT from an NFT database. In another aspect, the NFT database may be accessible by the token reader via a computer network. In another aspect, the NFT database may include, or be implemented as, a blockchain database like the blockchain databases used by cryptocurrency payment networks such as Ethereum, Bitcoin, Cardano, and others.

In another aspect, the disclosed system includes an NFT access device that optionally includes a token reader and an output device that may be operable to present output defined by a digital asset associated with the NFT. The NFT access device may be is configured to use the token reader to obtain the access control data from the access token. The NFT access device may be configured to engage the access control system via the computer network to determine if the NFT access device is allowed access to the NFT identified by the NFT identifier obtained from the access token. In another aspect, the NFT access device is operable to obtain the NFT specified by the access control data obtained from the access token. In another aspect, the computing device is operable to use the output device to present the digital asset associated with the NFT.

The present disclosure also includes a method for binding an NFT to an access token. The actions taken may include obtaining an NFT identifier for a Non-Fungible Token (NFT) using a computer. In this context, the identifier uniquely identifies an NFT stored in an NFT database. The method may also include authenticating the NFT using an access control system. The access control system optionally uses verification data and the NFT identifier to authenticate the NFT. In another aspect, the verification data optionally includes transactional data about the original NFT purchase, and optionally access control data specifying at least one user who is permitted access to the NFT. The verification data and the NFT identifier may be compared to access control data in an access control database to determine if the access token should be bound to the NFT. The method may further include binding the NFT to the access token when the verification data and the NFT identifier match the access control data. In another aspect, access token may be configured to retain at least a portion of the verification data, and the NFT identifier.

The present disclosure also includes a method for accessing an NFT using an access token that was previously bound to the NFT. The method optionally includes using a token reader to obtain verification data and/or an NFT identifier from an access token that is specific to an NFT. In another aspect, the verification data includes transactional data about an NFT purchase of the NFT and may also include access control data specifying at least one user who is permitted access to the NFT. The method may also involve authenticating the verification data and the NFT identifier received from the access token using an access control system. In another aspect, the verification data and the NFT identifier may be compared to access control data in an access control database to determine if the NFT is accessible. In another aspect, the access control system is optionally responsive to the token reader via a computer network. The method optionally includes obtaining a digital asset specific to the NFT via a computer network using a computer when the access control data and the verification data match. His digital asset may be an image, video, music file, and the like, and may then be made available for presentation using an output device.

Further forms, objects, features, aspects, benefits, advantages, and examples of the present disclosure will become apparent from the accompanying claims, detailed description, and drawings provided herewith.

DETAILED DESCRIPTION

Figure 1:
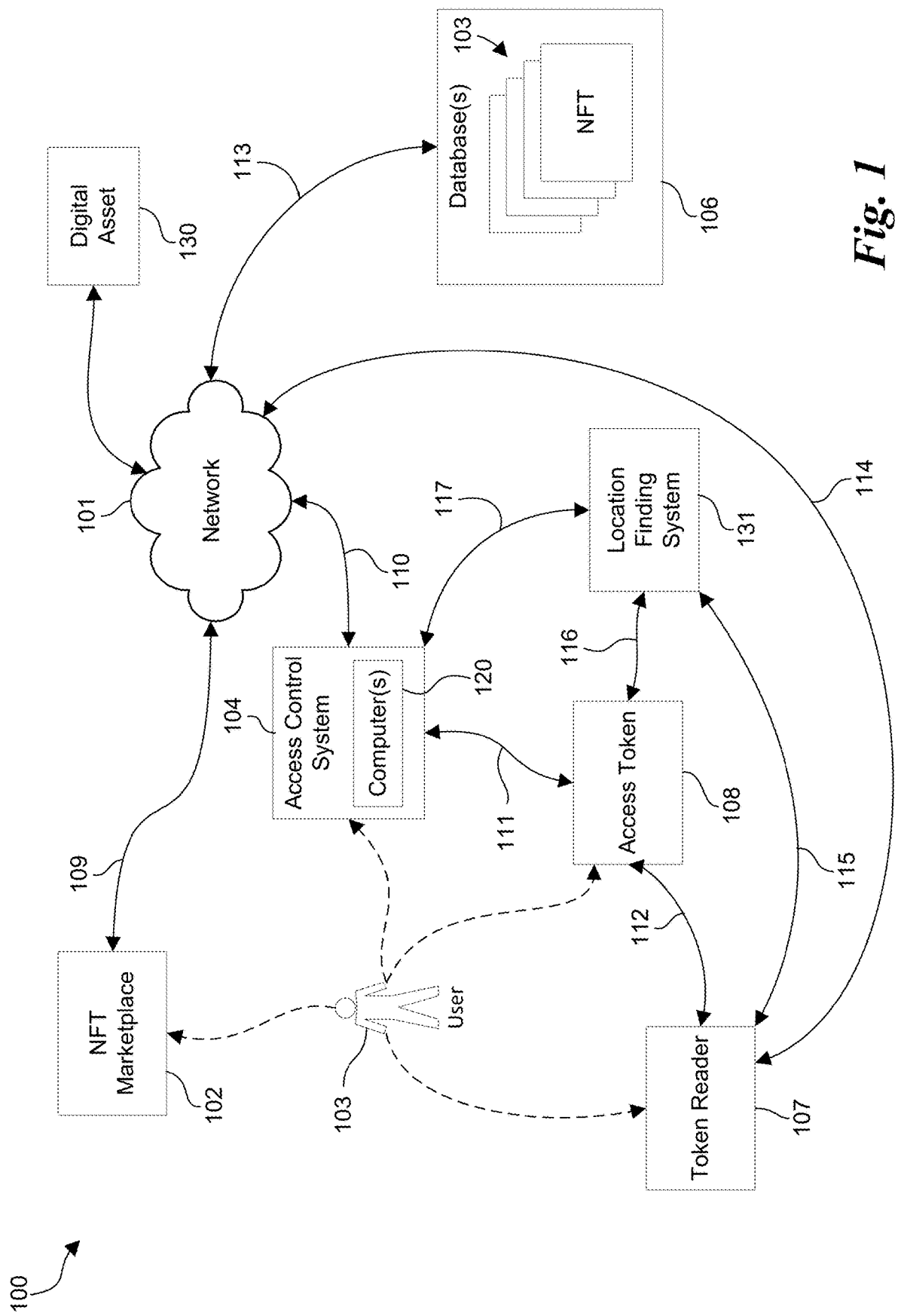
FIG. 1 is a diagram illustrating one example of the components that may be used to implement the disclosed system for accessing NFTs.

Examples of components that may be included with, or operate in conjunction with, the disclosed system are illustrated in FIG. 1. An NFT marketplace 102 may be accessed by a user 103 to acquire or maintain ownership of an NFT. The disclosed access control system 104 may interact with the NFT marketplace 102 to verify NFT ownership or NFT purchase transactions via a network 101. In another aspect, the access control system my include an access control module implemented in software, hardware, or any combination thereof. The access control module may be configured to implement the disclosed access control features to determine when an NFT is accessible.

The access control system 104 may include multiple computers 120 configured to manage the flow of information between the NFT marketplace 102, the database 103, the access token 108, the token reader 107, and the user 103, or with other collaborating systems, or any combination thereof. NFTs 103 may be stored in a database 106 (or on multiple separate databases 106) and accessible by the NFT marketplace 102, the access control system 104, and an NFT viewer 107. Communication between components may occur via communication links 109-117 and network 101. The token reader 107 may be used by the user 103 to read the identifying information from the access token 108 in order to get access to the an NFT 103, and to a digital asset 130 that an NFT 103 refers to. Once retrieved, the digital asset 130 may be viewed, listened to, watched, or otherwise experienced by the user 103 depending on the type of digital asset. In another aspect, the token reader 107 may also be configured as an NFT access device such as a smart phone, tablet, or other computing device configured to experience the NFT.

In another aspect, the token reader 107 is optionally responsive to the access token 108 and is configured to obtain access control data from the access token 108. The token reader 107 is optionally in communication with the access control system 104 via a computer network 101 and/or communications links 114 and 110, and is operable to provide access to an NFT 103 from the NFT database 106. The NFT database 106 is optionally accessible by the token reader 107 via the computer network 101, and or communications links 113 and 114.

In another aspect, the database (or databases) 106 may be implemented using any suitable data management system or data organization. In one example, the database 106 includes a ledger which is optionally distributed across multiple computing devices. The ledger may be implemented to use a blockchain database, or any other suitable data storage system. A blockchain implemented ledger may also provide self-executing contracts which may be configured to automatically initiate one or more separate transactions when the NFTs in the database are bought or sold. In another example, the database 106 may be a centralized data repository. In another example, the database 106 may include a Relational Database Management System (RDBMS), which may be distributed across multiple remote computing devices, or may be operated on a centralized computing device that includes multiple processors in any suitable configuration.

An access token 108 of the present disclosure may be used by the user 103 to verify ownership of an NFT 103 and may be issued by the access control system 104. For example, the access token 108 may be used by a user 103 to communicate identifying information specific to a given NFT 103 to the token reader 107 via a wired or wireless communications link 112. In one aspect, the token reader and access token communicate via wireless radio communication between transmitter and receiver circuitry in both the token reader 107 and access token 108. Signals transmitted between the token reader and the access token may be configured to define data useful for identifying a user, an NFT, or both, so that the access control system can 104 verify ownership and provide access to the NFT. The token reader may be configured to verify the access token 108 by interacting with the access control system 104 via communications link 114 and 110. Upon verification, the viewer 107 may obtain the NFT from database 106 and present the contents of the NFT to the user.

In one example, the access token 108 optionally includes circuitry for providing access to a digital a digital asset 130 that is related to an NFT 103. For example, an access token may be a physical object such as a card, picture frame, or other physical item that includes software and/or hardware implementing the disclosed access token functionality. The circuitry may be configured to automatically interact with the disclosed system to present the access control information and provide access to the NFT and the related digital asset. The access control information may be stored or encoded in the access token by any suitable method such as in a memory of a Near Field Communication (NFC) chip or NFC card, as a pattern of colors or other patterns readable by an optical reader such as in the case of barcodes, QR-codes and the like, or in a memory of a Radio Frequency Identification (RFID) chip or RFID cards, or by any other suitable method, or any combination thereof.

In another aspect, the circuitry in the access token 108 may include NFC communications equipment such as an antenna, battery, processor or other control circuit, memory, a display device, or any combination thereof. In another aspect, the access token may be configured to receive a unique URI from the system when the token is bound to and NFT. This URI may be stored in nonvolatile memory and may be provided as a means for attempting to access and retrieve the NFT using the token.

In another aspect, the access token 108 is optionally configured to retain access control data for an NFT 103. This access control data may include an NFT identifier for uniquely identifying an NFT, and verification data specific to the NFT identifier. The verification data may include transaction information, and/or purchase verification data that is specific to the NFT. This data may include data generated by the NFT marketplace 102 uniquely identifying the NFT 103, the purchase transaction, or both. Other data related to the transaction may be accepted as input such as the date, time, name of the owner, and the like.

In another aspect, the verification data optionally includes a user ID and a password, and wherein the access control system is configured to match the user ID and the password with input provided by a user, and to deny access to the NFT when the input provided by the user fails to match the user ID and password.

In another aspect, the verification data optionally includes purchase data specific to an NFT purchase of the NFT specified by the NFT identifier. In another aspect, the access control system 104 may be operable to access transactional data stored in an access control database. The transaction data may be unique to, or specific to, the NFT purchased. In another aspect the access control system 104 is optionally configured to compare the purchase data specific to the NFT purchase with the transactional data from the access control database, or from the NFT marketplace, or both, in order to determine if access to an NFT specified by the access token should be granted. For example, the access control system 104 may be configured to deny access to the NFT when the purchase data does not match the transactional data for the NFT specified by the NFT identifier. In another example, the access control system 104 may be configured to grant access to the NFT when the purchase data matches the transactional data for the NFT specified by the access token.

In another aspect, the verification data optionally includes geolocation data defining a specified area. The token reader 107 may be configured to access a "geolocation" or "location finding" system 121. This location finding system my use any suitable location finding technology or system including but not limited to the Global Positioning System (GPS), WiFi, cellular networks, radio beacon transmitters, or other devices configured to determine a location of the token reader. The access control system 104 may be configured to deny access to the NFT specified by the access token 108 when the location of the token reader 107 is outside the specified area. In another aspect, the access control system 104 may be configured to allow access to an NFT specified by an access token 108 when the location of the token reader 107 is inside the specified area.

In another aspect, computers of the disclosed system may be configured to additionally accept or automatically determine other information about the user that may be used to generate the unique ID. For example, the system may optionally include a location finding system 131, or may be configured to access a location finding system 131 via one way or two way communication links that may be used to generate geolocation data about the user, and this geolocation data may be useful in generating at least a portion of the verification data. Examples of geolocation data may include, but are not limited to, the user's mailing address, location data taken from the computing device such as in the case of accessing geolocation data provided by a smart phone, location data provided by the WiFi or cellular data network that may be used to approximately determine the user's location, the users IP address, MAC Address, or other computer identifier, or any combination thereof.

In another aspect, multiple components of the present disclosure may be mounted to or enclosed within a common housing and thus implemented by a single computing device. In another aspect, any suitable combination of the illustrated components may be implemented as separate computers remote from one another, or as individual computing devices configured to include multiple components of the present disclosure. Thus some or all of the components of the disclosed system may implemented in varying combinations according to the needs of the user. Some examples of these various configurations are discussed herein and illustrated in the related figures.

Figure 2:
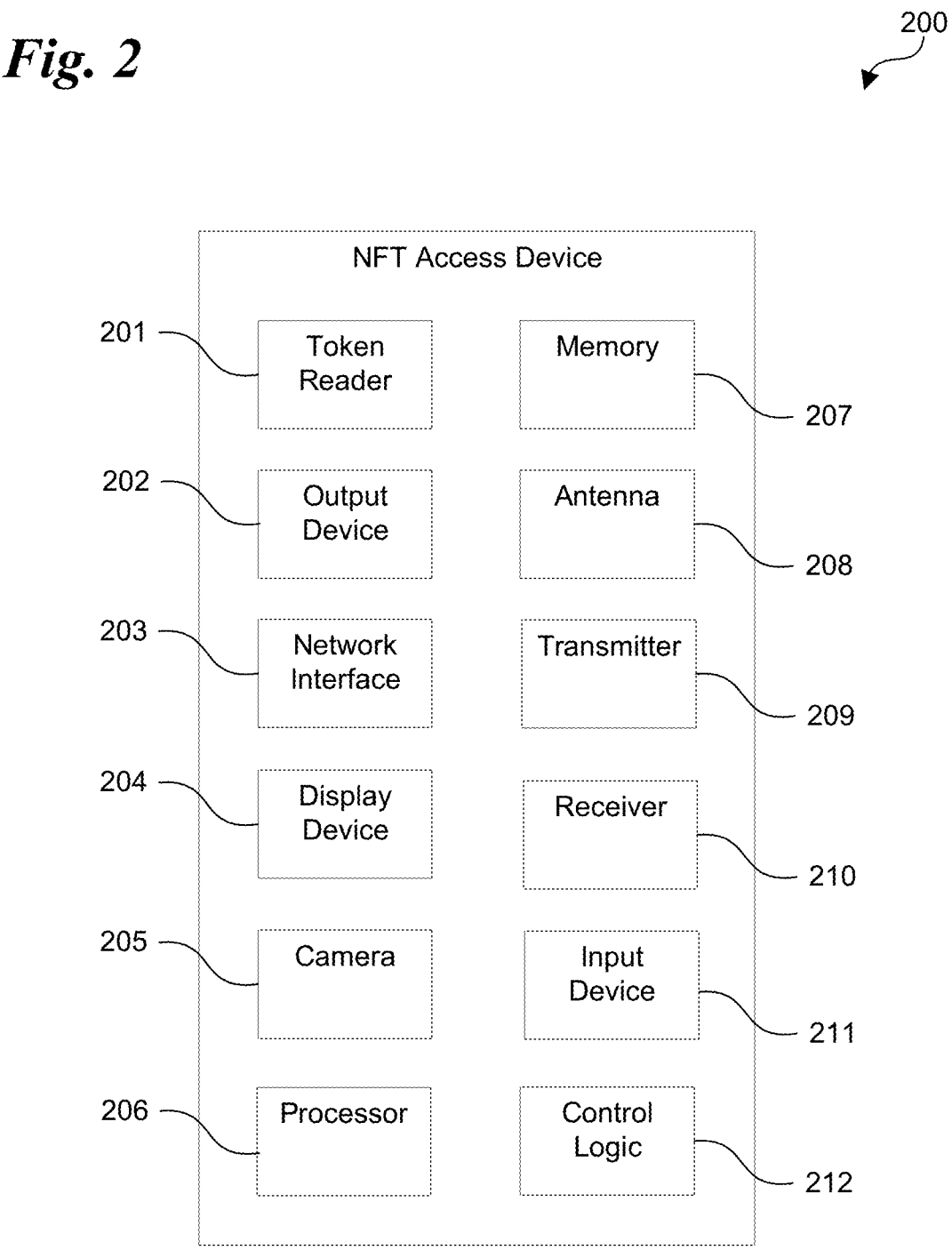
FIG. 2 is a diagram illustrating one example of components that may be limited in NFT access device of the present disclosure.

In one example, an NFT may be accessed using a device that includes various components of the present disclosure in a single device that is optionally portable and/or convenient to operate. FIG. 2 illustrates components that may be included in one example of an NFT access device at 200. All of the components illustrated at 200 may be implemented as software, hardware, or any suitable combination thereof. For example, an NFT access device optionally includes a token reader 201 of the present disclosure, examples of which are discussed herein elsewhere. An NFT access device may optionally also include an output device 202 as discussed herein such as a screen, audio speaker, or other device operable to present output to a user. In another aspect, the output device 202 may be operable to present output defined by a digital asset associated with an NFT accessible using the device. This digital asset may include data values defining a single image, multiple images such as in the case of a movie or "live image", a sound file, PDF document, or other file. Any digital asset related to an NFT may be presented by the output device.

NFT access device 200 may include a network interface operable to connect to wired or wireless network by any suitable protocols. For example, network interface 203 may be operable to interact with a Wi-Fi network, a Bluetooth network, a Near Field Communication network, or any combination thereof. Network interface 203 may also the operable to interact with Radio Frequency Identification (RFID) tags in either a passive or active form. Network interface 203 may include multiple software or hardware modules operating together to implement one or more network protocols thus allowing the NFT access device 200 to establish and maintain communication links with multiple different types of other remote devices.

The NFT access device includes a display device 204 separate from the output device 202. The display device may be implemented in any suitable form such as by including a touch screen, projector, or other device for displaying the contents of a digital asset associated with NFT. In another aspect, the access device 200 may include an audio or visual input device such as a camera 205 operable to capture a field-of-view relative to the NFT access device. For example, camera 205 may be mounted to the device so that a user may capture a still image or video image using camera 205 while holding the NFT access device. In another aspect, the NFT access device may be operable to activate the camera 205 and the display device 204 such that the NFT access device makes it possible for a user to capture an image using the camera while simultaneously viewing the image capture as it occurs. An example of this process is explained in further detail in later figures with respect to an NFT access device which may be implemented as a smart phone with a camera and screen, where the smart phone is programmed to implement the disclosed functionality for accessing and displaying the digital asset of an NFT.

The NFT access device 200 optionally includes a processor 206, memory 207, both of which may be useful for processing and maintaining data to implement the disclosed functionality. An antenna 208 may be included by which electromagnetic radiation in any suitable wavelength may be captured by a receiver 210, or transmitted by a transmitter 209. The NFT access device 200 may include multiple different antennas, transmitters, and receivers as necessary to implement the wired, or wireless, communication links of the present disclosure.

In another aspect, the NFT access device 200 may include an input device 211 such as a keyboard, an array of buttons, a touchscreen, microphone for accepting voice commands, or any other suitable input device, or combination of devices. In another aspect, camera 205 may operate as an input device for capturing facial expressions, movements, or other imagery within its field-of-view that may be useful as input to the disclosed system.

In another aspect, the NFT access device may include control logic 212 which may be implemented as software, or hardware, or any combination thereof, as is the case for all the other components illustrated in FIG. 2. Control logic 212 may include software modules or components for programming or configuring processor 206 to control or execute the various functional aspects of the present disclosure such as accessing verification data from the access token, obtaining access control data from the access control system, activating or deactivating the token reader, camera, or output devices, interacting with a location finding system, NFT databases, and NFT marketplace, and the like.

In another aspect, the NFT access device 200 may be configured to use the token reader 201 to obtain access control data from an access token such as access token 108. The NFT access device 200 is optionally configured to engage the access control system via the computer network to determine if the NFT access device is allowed access to an NFT identified by the NFT identifier obtained from an access token. The NFT access device may also be operable to obtain the NFT specified by the access control data obtained from the access token, and optionally operable to use the output device to present the digital asset associated with the NFT. This may be accomplished using the display device 204, or another different display device that is nearby and may be accessible by multiple NFT access devices.

Figure 3:
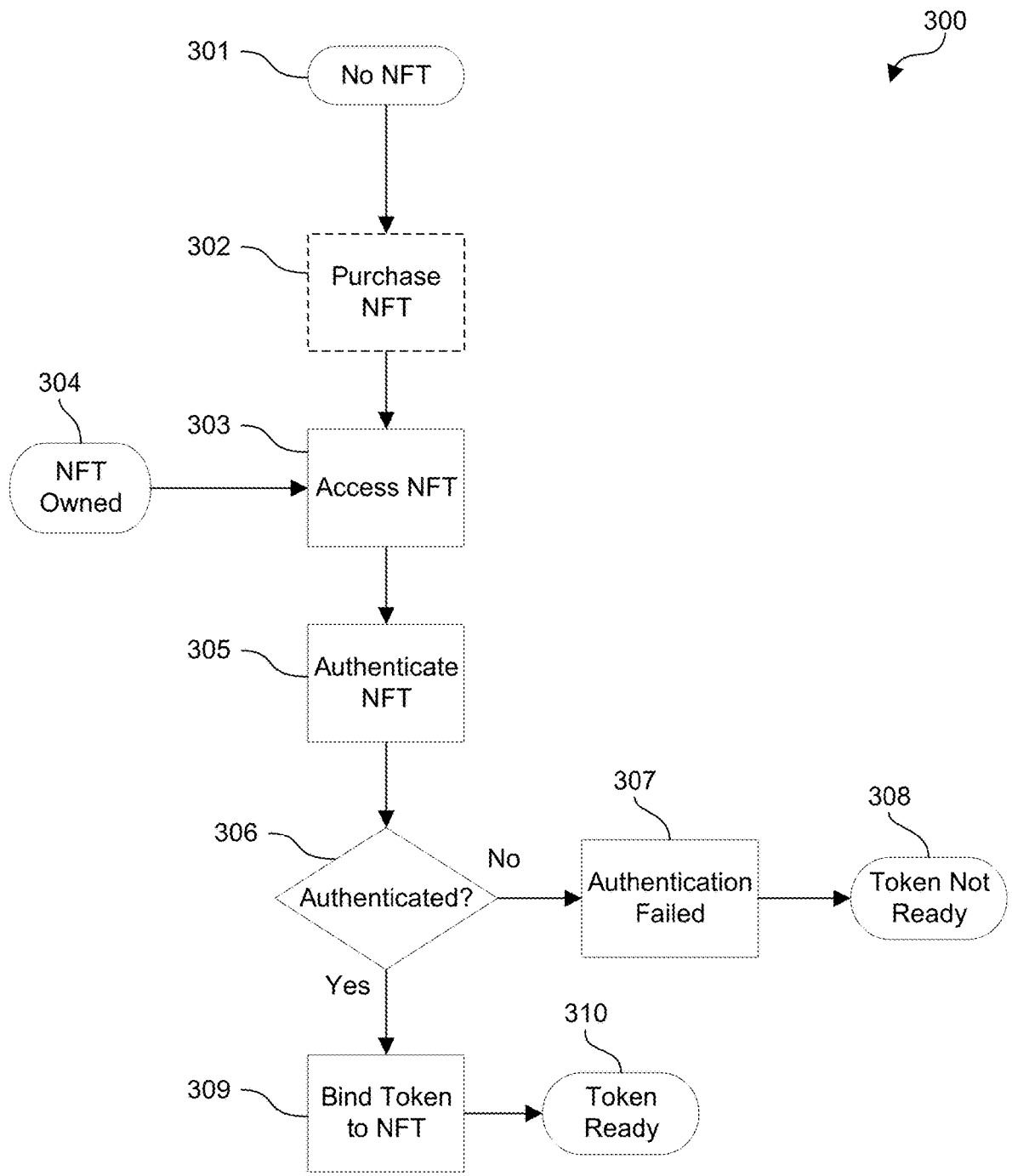
FIG. 3 is a flow chart illustrating aspects of binding an NFT to an access token according to the method of the present disclosure.

In another aspect, the disclosed system is optionally configured to bind an NFT to an access token. One example of actions the disclosed system may take to bind the token with an NFT are illustrated in FIG. 3. In one example, a user may not own an NFT at 301, and may optionally purchase an NFT at 302 such as via an NFT marketplace. In another aspect, the user may own an NFT at 304. In either case, the user may interact with the disclosed system to provide identifying information that may be used to access the NFT at 303.

The user may, for example, interact with computers 120 of the access control system which may be configured to accept proof of purchase credentials for the NFT. The computers 120 may generate or otherwise provide a user interface configured to accept user input defining one or more aspects of the purchase credentials. In another aspect, the computers 120 may include a personal computing device such as a smart phone, tablet, laptop, or desktop computer which optionally is configured to provide the user interface via an application such as an executable custom software program configured to automatically interact with server computers of the access control system 104. In another aspect, the server computers of the access control system may generate or provide a user interface via a web browser executing on the personal computing device of the user, such as by sending a web page to the personal computing device that is then automatically rendered by the web browser. Thus it may be said that the access control system of the present disclosure optionally includes personal computing devices operated by the user interacting, and/or remote servers configured to provide or deny access to an NFT.

In another aspect, computers of the disclosed system may automatically authenticate an NFT at 305 based on identifying information provided by the user. This information may be obtained by accepting input from the user using any suitable computing device. Authenticating the NFT is optionally performed automatically by a computer, and the computer may automatically provide the verification data which includes user specific information identifying a user that is retained by the computer. For example, the information such as username, password, address, purchase information, biometric information, and the like, that may be stored in a smart phone or tablet computer may be automatically provided during the process of authenticating whether the user should be allowed to bind the NFT to an access token.

In one example, computers 120 may be configured to automatically compare the information provided by the user to the data in one or more NFT databases at 305. If the NFT cannot be authenticated according to the input provided at 306, authentication fails at 307, the access token is not bound to the NFT, and the process of binding the NFT to an access token fails at 308. When the NFT is authenticated at 306, the computers of the disclosed system bind the token to the NFT at 309, and the process optionally concludes with an access token that is ready to be used at 310.

Binding the token to the NFT at 309 may include creating a unique ID or access key that is specific to the NFT, and optionally is also tied specifically to the owner. This access key can then be assigned to the access token, and is optionally written in a record of the access control database, or optionally in the database 106 the NFT is stored in, or both. In one aspect, the credentials may include purchase verification data specific to the NFT, which may include data generated by the NFT marketplace 102 uniquely identifying the NFT 103, the purchase transaction, or both. Other data related to the transaction may be accepted as input such as the date, time, name of the owner, and the like.

In another aspect, computers of the disclosed system may be configured to additionally accept or automatically determine other information about the user that may be used to generate the unique ID. For example, the system may optionally include a location finding system, or may be configured to access a location finding system that may be used to generate geolocation data about the user, and this geolocation data may be useful in generating the unique ID. Examples of geolocation data may include, but are not limited to, the user's mailing address, location data taken from the computing device such as in the case of accessing geolocation data provided by a smart phone, location data provided by the WiFi or cellular data network that may be used to approximately determine the user's location, the users IP address, MAC Address, or other computer identifier, or any combination thereof.

In another aspect, the system may be configured to update ownership information of the NFT in the database 106, either automatically when the token is bound to the NFT, or optionally upon receiving specific input from a user initiating the ownership update. In another example, the disclosed system optionally ensures that the access control information for the particular NFT and the access token is also reflected in the blockchain ledger.

In another aspect, the binding operation at 309 includes generating or updating a physical item, such as access token 108, to include the access control information, and optionally, other data useful for providing access to the NFT. In another aspect, the access token may be configured to receive a unique URI generated by the access control system when the token is bound to the NFT at 309. This URI may be stored in nonvolatile memory and may be provided as a means of attempting to access and retrieve the NFT using the token.

Figure 4:
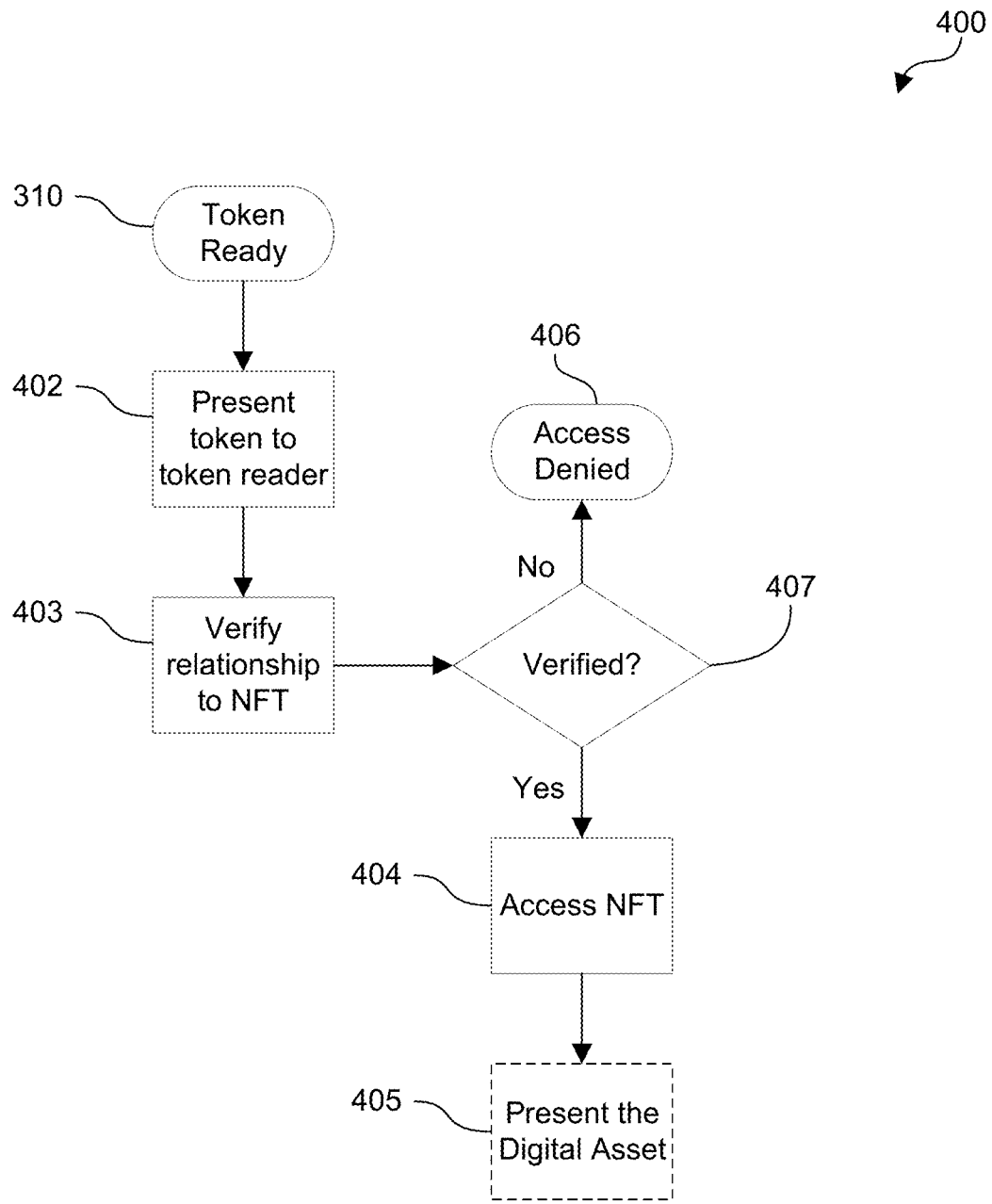
FIG. 4 is a flow chart illustrating aspects of accessing an NFT using an access token according to the method of the present disclosure.

An example of actions the system might be configured to take to provide access to an NFT using an access token are illustrated at 400 in FIG. 4. With a token ready to use at 310, the user may present the token to a token reader (like token reader 107 for example, or any other token reader of the present disclosure). The token reader may be optionally configured to engage the access token to retrieve the access key, NFT identifier, or any other relevant access control information. Other information such as a URI may be provided as well to facilitate access to the digital asset related to the NFT. In another aspect, the token reader of the present disclosure may be configured to read QR codes, bar codes, RFID tags, NFC cards, or any other suitable type of access token.

The token reader may be configured to access the computers 120 to verify the relationship between the access token and the NFT at 403. The computers 120 may, for example, be configured to automatically access data about the NFT from one or more databases in order to compare identifying information about the NFT with the access control information provided by access token via the token reader. This may include executing one or more verification rules that are configured to trigger a verification failure if the access information provided by the unique ID does not match the conditions specified by rules implemented in the access control system. If the identifier provided by the access token is not verified at 407, then access to the NFT is denied at 406.

When access is verified at 407, access to the NFT is provided to the user, such as via the token reader. The token reader may also include a display device, audio output, or other related equipment for displaying or otherwise experiencing the NFT at 405. In another aspect, once access is verified, the system may be configured to stream the NFT to an NFT access device of the present disclosure whereby a user may experience the NFT. The digital asset related to the NFT may be thus delivered as a stream of bytes passing over a network to the NFT access device.

In one example, the NFT access device may be a smart phone, tablet, or other personal computing device. In this example, the NFT access device may also operate as a token reader 107 configured to interact with the access token, such as by NFC, RFID tag, and the like, to obtain the unique identifier and access the NFT. The access control system may, for example, check one or more blockchain ledgers using the NFT identifier, and/or other access control information, to ensure the access token is authorized to access the NFT content. If the access control information does not match the ownership information contained in a blockchain ledger, or in another access control database (at 407), the system optionally is configured to deny access to the NFT (406). Where the authenticating information matches the information obtained from the access control system, the user may be granted access to the NFT at 404, and optionally the digital asset associated with the NFT (at 405).

Figure 5:
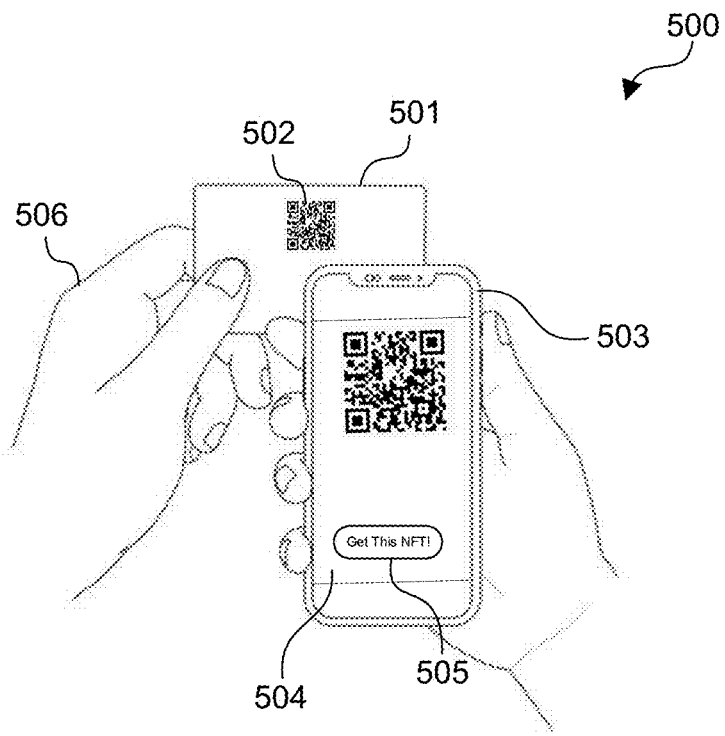
FIG. 5 illustrates one example of using the disclosed system to obtain data from an access token of the present disclosure.
Figure 6:
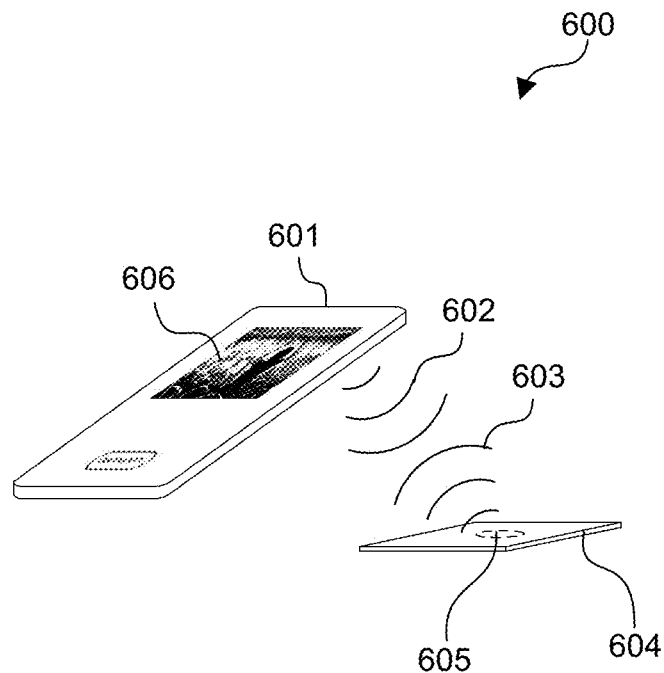
FIG. 6 illustrates another example of using the disclosed system to obtain data from an access token of the present disclosure.

FIGS. 5 and 6 illustrate at least two different ways in which access control and other data may be obtained from an access token using a token reader of the present disclosure. In FIG. 5 at 500, an access token 501 includes access control data, an NFT identifier, and/or other data that may be retained by the access token as a barcode 502. In this example, the barcode 502 includes a QR code, but any suitable barcode may be useful for retaining data about the NFT. A token reader 503 optionally includes a code reader operable to scan the barcode 502 to obtain an NFT identifier, access control data, or any other data retained by the barcode. In another aspect, the barcode may retain access information such as a URI to the access control system, or a URI to an NFT market place, or other suitable data by which access to an NFT may be selectively granted. In another aspect, the token reader may include a camera or other scanner by which the token reader may obtain and decode the data defined by the barcode 502. The token ready may optionally include software for decoding or otherwise determining the data the barcode represents.

In another aspect, the token reader may include an input device 504, which may also double as an output device. In this example, the input device includes a touch screen by which a user may view the image capture from the camera or barcode scanner to determine when the barcode scanner is properly positioned to capture the barcode 502.

The input device 504 may include or present a user interface 505 configured to accept input from the user 506. The verification data retained by the barcode 502 may include a user ID and a password. This user ID and password may be stored in plain text, or obfuscated in some way, such as by hashing, single key encryption, or public/private key to name a few non-limiting examples. The access control system of the present disclosure is optionally configured to match the user ID and the password provided by the user with the user ID and password stored in the access token, and to permit or deny access to an NFT when the input provided by the user either matches, or fails to match, respectively, the user ID and password in the access token 501.

Thus obtaining the verification data for an NFT from the access token 503 may include activating a scanner of the token reader 503 that is configured to read a barcode like barcode 502. The verification data and/or the NFT identifier itself are retained by the access token 501 as part of a barcode 502. In another aspect, obtaining the verification data from the access token 501 may include accepting input from a user 506 using the token reader 503. The token reader 503 optionally includes an input device 504 for accepting the input using a user interface 505. This input from the user may be used to obtain transactional information about the NFT from a third party via a computer network. The third party may include an NFT marketplace, an NFT database, or any other outside service by which the authenticity of a user's claim of access to an NFT may be determined.

In one aspect, the token reader may be implemented using the features and functionality provided in a computing device such as a smartphone or tablet computer which may include a camera, software and hardware for decoding a barcode, networking capabilities for accessing remote servers, output devices for displaying content, input devices for accepting user input, and the like, some or all of which may be useful in obtaining access to an NFT using the access token. In another aspect, the access token may be a physical item such as a card, plaque, poster, or another computer with a screen to display a barcode. In another aspect, the access token may include a power source, a memory for retaining verification information and an NFT identifier or other information, as well as optionally including a transmitter coupled to an antenna for broadcasting information about the NFT to all nearby token readers.

An example of this approach is illustrated at 600 in FIG. 6. A token reader 601 of the present disclosure includes an antenna electrically connected to a transmitter thus configuring the token reader 601 to send electromagnetic signals 602 defining a request for information. The token reader optionally includes a receiver configured to receive signals 603 sent by an access token 604. The access token 604 may include circuitry 605 that may optionally include a power source, control circuits, memory, or other components for retaining verification information, an NFT identifier, or other useful data the system may require. The circuitry 605 may include an antenna and transmitter compatible with the antenna and receiver in the token reader 601, thus allowing the access token to respond to a request sent from the token reader 601. The access token 604 and the token reader 603 may each include separate compatible communication circuits configured to implement any suitable communication protocol such as a Near Field Communication (NFC), Wi-Fi, or Bluetooth to name a few nonlimiting examples. In another example, the circuitry 605 of the access token 604 may include active or passive Radio Frequency Identification (RFID) circuitry whereby the data stored in the access token 604 may be obtained by the token reader 601. These are some nonlimiting examples of how the token reader of the present disclosure may be operable to obtain the access control data, NFT identifiers, or other data from the disclosed access token via a wireless networking protocol. If authenticated, the digital asset associated with the NFT information on the access token 604 may be displayed using a display device 606 of the token reader 601.

In this example, the token reader 601 may also be implemented like the token reader 503, and others disclosed herein, and may make use of the features and functionality provided in a computing device such as a smartphone or tablet computer which may include a camera, software and hardware for sending and receiving data via multiple different network protocols, output devices for displaying content, input devices for accepting user input, and the like. In this example, token reader 601 may be implemented using a smartphone or tablet computer communicating with a token implemented as a card or other physical object that includes the control circuitry 605 and is operable to communicate with the token reader 601.

Figure 7:
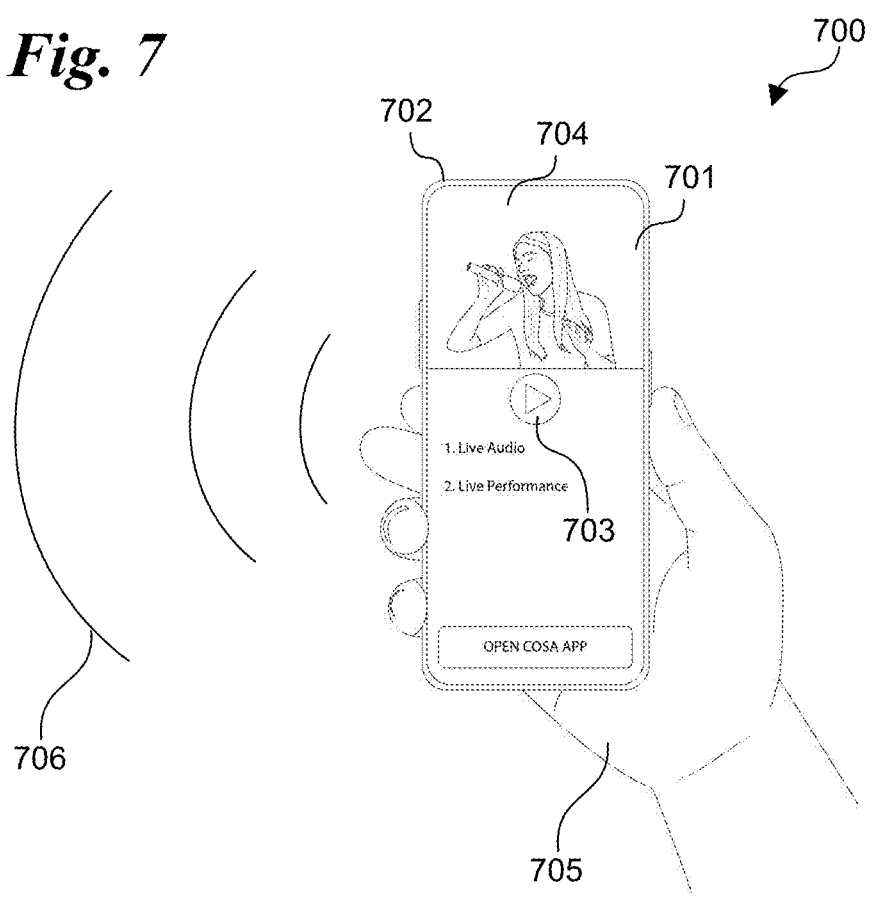
FIG. 7 illustrates one example of using the disclosed system to present data associated with an NFT.
Figure 8:
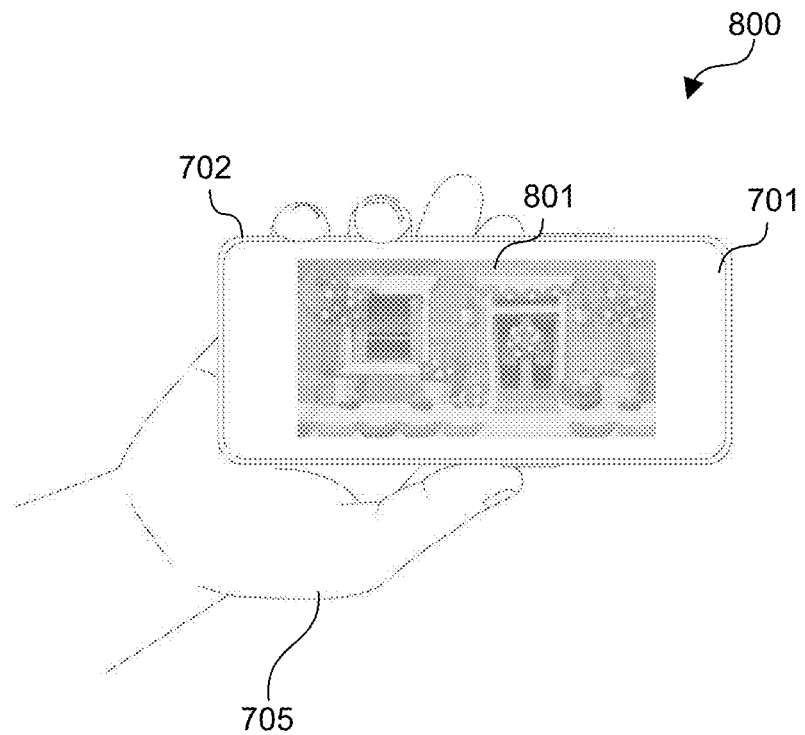
FIG. 8 illustrates another example of using the disclosed system to present a different type of data associated with an NFT.

FIGS. 7 and 8 illustrate examples of some different types of digital assets that may be accessed using devices of the present disclosure. In FIG. 7 at 700, a computing device 702 is optionally configured to operate as a token reader and is thus able to obtain access control data and NFT specific information, and to communicate with an access control system to obtain access to an NFT, and to the digital asset associated with the NFT. The device 702 may include a display device 701, and one or more audio output devices operable to generate sound 706 as defined by the digital asset, preferably sound that is audible to a human user 705, although this is not required. In this example, the digital asset associated with the NFT includes data defining sounds that are playable using the audio output device. User interface components 703 may be included to provide user 705 with controls by which to play the audio associated with the NFT.

In another aspect, the digital asset optionally includes one or more images 704 that may be associated with the generated audio 706. The images 704 may also be defined in the data of the digital asset as images to be displayed in sequence over time, such as in the case of a movie or video image. In another example illustrated at 800 in FIG. 8, the digital asset optionally defines one or more individual still photographs 801 displayable using the display device 701. In this example, the digital asset optionally includes an image file.

Figure 9:
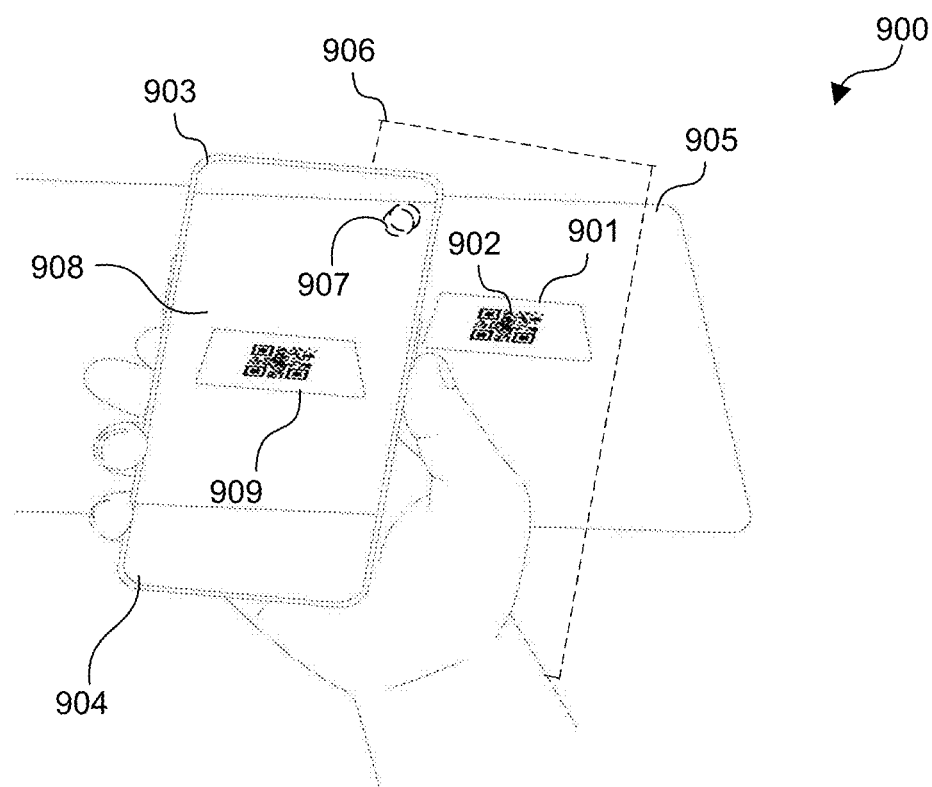
FIG. 9 illustrates another example of using the disclosed system to data from an access token of the present disclosure.
Figure 10:
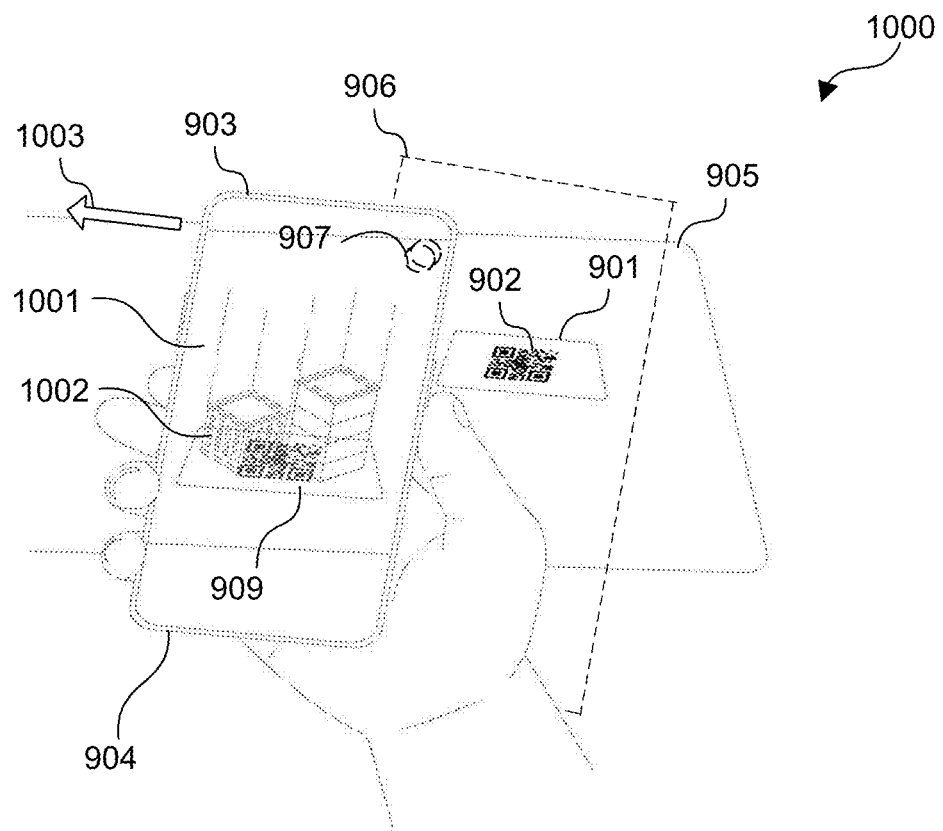
FIG. 10 illustrates another example of using the disclosed system to present data associated with an NFT.

In another example illustrated in FIGS. 9 and 10, the disclosed system is optionally operable to implement an augmented reality presentation of the NFT digital asset. An access token 901 of the present disclosure includes the data discussed herein elsewhere include access control data, an NFT identifier, and the like, here retained as a barcode 902. As explained herein elsewhere, the data may be retained and made available to a token reader 903 by any suitable means such as via radio communication between the token 901 and the token 901, or by any other suitable means. The token reader may be implemented as part of a computing device such as a smart phone or tablet computer. The token reader 903 may include an output device, which optionally includes a display device 904 configured to display an image. As illustrated at 900, the token reader 903 optionally includes a camera 907 arranged and configured to capture an image 908 of a capture area 906 that includes objects such as access token 901, and object 905, here shown as a being behind the access token 901. This image(s) 908 are optionally displayed using the display device 904. In another aspect, an image 909 of the access token may appear on the display area while access is being granted to the NFT.

In another aspect, the digital asset associated with the NFT accessible via access token 901 optionally defines one or more images 908 for display on the display device 904 (here implemented by a multi-purpose computing device). In this example, token reader 903 is configured to overlay, superimpose, or otherwise combine the one or more images of the digital asset associated with the NFT with the one or more images captured by the camera 907 to create a combined visual presentation 1001, illustrated at 1000 in FIG. 10.

In this example, the display device 904 is optionally operable to display the combined visual presentation 1001, either as a still image (a single combined image), or as a sequence comprising multiple images (a combined video image), after access to the NFT is granted, and after the digital asset associated with the NFT is received by the device 903. In another aspect, the digital asset for the NFT optionally defines an NFT video, and the one or more images captured by the camera 907 define a background video of the area adjacent to the token reader 903. The combined visual presentation 1001 here includes the NFT video superimposed over the background video.

In another aspect, one or more objects 1002 from the NFT video appearing in the combined visual presentation are optionally superimposed over the access token 901 in the combined image 1001. In another aspect, panning the camera 907 in the direction 1003 results in capture area 906 shifting in that direction away from the access token 901. However in this instance, the access token 901 and the object 1002 from the NFT video optionally remain in place relative to each other, and relative to the image 909 of the access control token as this occurs. Thus, as the capture area shifts with the movement of the camera 907, the token reader 903 operates to provide an augmented reality view of the digital asset associated with the NFT, whether that data defines a single image, several images, an audio file, or a series of images presented as a movie. The image(s) provided by accessing the NFT are superimposed in front of, behind, or as part of the background imagery, but remain stationary relative to the background when the camera pans around the area adjacent to the access token. In the resulting imagery, the digital asset optionally remains anchored in place relative to the access token in the combined augmented reality image. This anchor point may be the physical access token itself, a location in the area adjacent to the token reader, a predefined portion of a nearby object such as a wall or table, and the like. In this example, the token reader 903 optionally includes a processor or other control circuitry configured to control the camera 907 to acquire the image, and configured to execute program code configured to combine the images 908 and 1001. The software and/or hardware of the token reader 903 may also be operable to define the anchor point digital asset should appear in the resulting augmented reality presentation.

Figure 11:
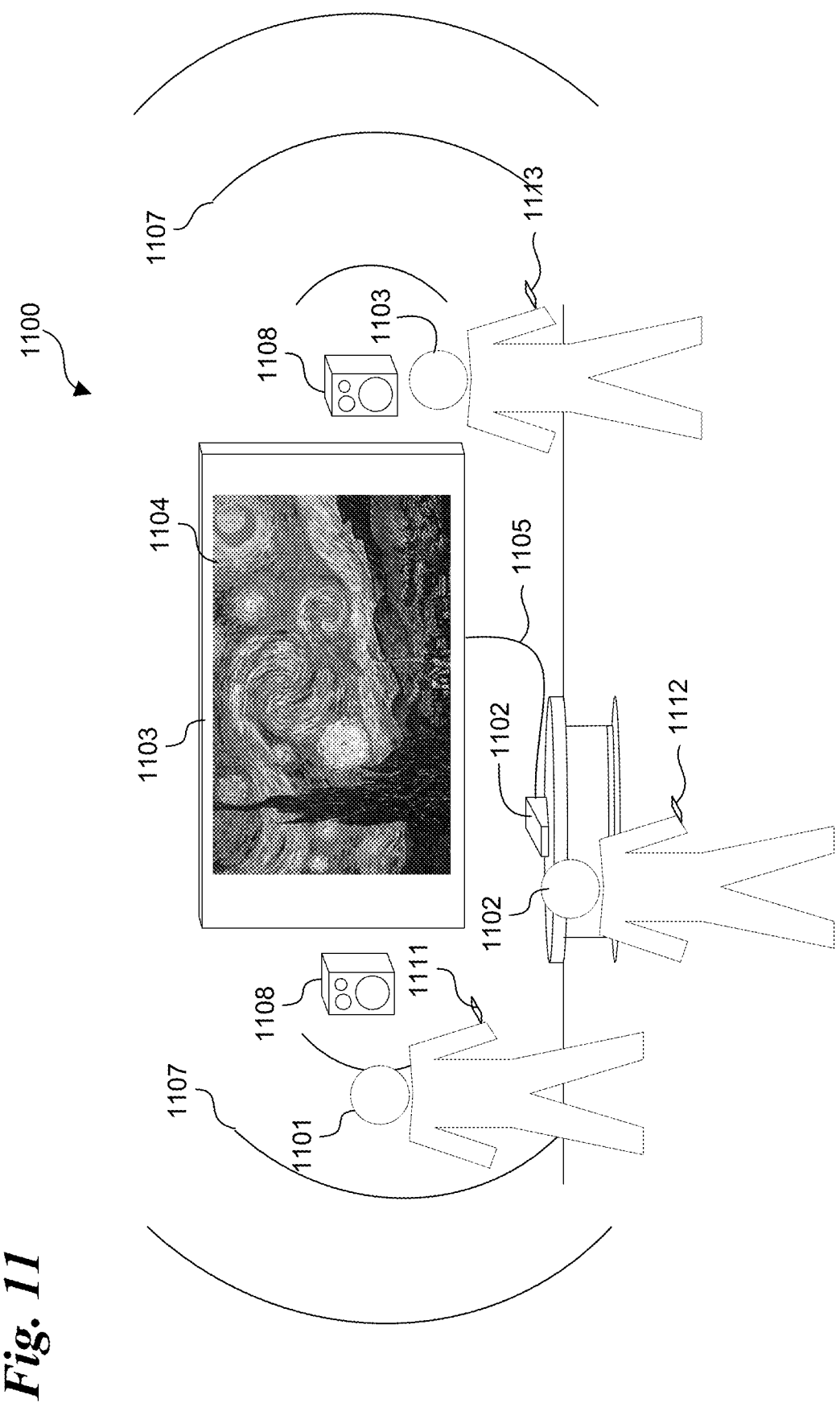
FIG. 11 illustrates another example of using a different configuration of the disclosed components to present data associated with an NFT.

FIG. 11 illustrates yet another example of the disclosed system in operation at 1100 where multiple users 1101-1103 optionally use multiple access tokens 1111-1113 respectively to display multiple different images and videos, or to play music, or to otherwise present digital assets associated with the NFTs accessible via tokens 1111-1113. A centrally located and optionally shared token reader 1102 of the present disclosure may be responsive to the access tokens 1111-1113, and is optionally able to scan and obtain access control information, an NFT identifier, and possibly other useful data from the access tokens as discussed herein elsewhere. The token reader 1102 may include an input device, user interface, or other components discussed herein elsewhere for accepting input from users 1101-1103 whereby the users may gain access to the NFTs associated with the tokens, and thus allow other users to experience the related digital assets of different users in a group environment.

In this example, a display device 1103 is optionally in communication with token reader 1102 via a communication link 1105 which is of any suitable type, such as may be provided via a wired or wireless network connection, to name a few non-limiting examples. In this configuration, users 1101-1103 may approach the token reader 1102 and place their respective access token 1111-1113 in proximity to the token reader 1102. The token reader may interact with the access token as discussed throughout the present disclosure to acquire the digital asset for the NFT associated with the access token. This digital asset may then be presented using the display device 1103 to display an image or video 1104, and/or by using audio output devices 1108 operable to generate sound 1107 as may be included with the digital asset. In this way users may use the system and method of the present disclosure to share their NFTs with multiple other individuals in a group environment such as at a party, at a conference, in an academic setting, in a street festival, or marketplace, or anywhere where individuals may gather for this purpose.

The concepts illustrated and disclosed herein related to a system for accessing NFTs may be arranged and configured according to any of the following non-limiting numbered examples:

Example 1: A system for accessing NFTs via a physical token or certificate, wherein the physical token or certificate includes an NFC chip.

Example 2: The system of any preceding example, wherein the system is configured to accept user input to generate a unique ID that is associated with the NFT.

Example 3: The system of any preceding example, wherein the system is configured to use IP address, referring URL, user ID, and/or a password to verify the identity of a user.

Example 4: The system of any preceding example, wherein the system is configured to automatically amend the blockchain ledger that the NFT is stored on with the generated unique ID.

Example 5: The system of any preceding example, wherein the physical token is a card with an NFC chip that contains the unique ID related to the NFT.

Example 6: The system of any preceding example, wherein the NFC card is configured to store a unique URL by which the NFT may be accessed.

Example 7: The system of any preceding example, wherein the system includes a reader, such as an optical reader, scanner, optical scanner, smart phone, computer input device, or any combination thereof, configured to read and access the NFT according to the contents of the token.

Example 8: The system of any preceding example, wherein the system is configured to compare the unique ID of the NFC card against the blockchain ledger to provide access to the NFT.

Example 9: The system of any preceding example, wherein the system is configured to deny access to the NFT if the unique ID in the NFC card does not match the ownership information on the blockchain ledger.

Example 10: The system of any preceding example, wherein the token is configured to store and verify identifying information using any suitable method, such as NFC chip, NFC card, barcode, QR-code, RDIF card, or any combination thereof.

Example 11: The system of any preceding example, wherein the system is configured to access multiple blockchain ledgers as needed to access the NFT.

Example 12: A system, comprising an access token configured to retain access control data for a Non-Fungible Token (NFT) that includes an NFT identifier for uniquely identifying an NFT, and verification data specific to the NFT identifier; and a token reader, wherein the token reader is responsive to the access token and is configured to obtain the access control data from the access token, wherein the token reader is in communication with the access control system via a computer network and is operable to provide access to an NFT from an NFT database, wherein the NFT database is accessible by the token reader via a computer network.

Example 13: The system of example 12, comprising an access control system configured to compare the verification data obtained from the access token with access control data maintained in an access control database accessible by the access control system, wherein the access control system is configured to deny access to an NFT when the verification obtained from the access token data does not match the access control data in the access control database for the NFT identified by the NFT identifier.

Example 14: The system of any one of examples 12-13, comprising an NFT access device that includes the token reader and an output device that is operable to present output defined by a digital asset associated with the NFT, the NFT access device is configured to use the token reader to obtain the access control data from the access token, the NFT access device is configured to engage the access control system via the computer network to determine if the NFT access device is allowed access to the NFT identified by the NFT identifier obtained from the access token, the NFT access device is operable to obtain the NFT specified by the access control data obtained from the access token; and wherein the wherein the computing device is operable to use the output device to present the digital asset associated with the NFT.

Example 15: The system of any one of examples 12-14, wherein the output device includes a display device, and the digital asset associated with the NFT defines one or more images for display on the display device.

Example 16: The system of any one of examples 12-15, comprising a camera operable to capture one or more images of objects within a capture area defined by the camera, wherein the output device is configured to display the one or more images captured by the camera. The NFT access device is configured to combine the one or more images of the digital asset associated with the NFT with the one or more images captured by the camera to create a combined visual presentation; and wherein the output device is operable to display the combined visual presentation.

Example 17: The system of any one of examples 12-16, wherein the digital asset defines an NFT video, wherein the one or more images captured by the camera defines a background video, and wherein the combined visual presentation includes the NFT video superimposed over the background video.

Example 18: The system of any one of examples 12-17, wherein the output device includes an audio output device, and the digital asset associated with the NFT includes data defining sounds that are playable using the audio output device.

Example 19: The system of any one of examples 12-18, wherein the access token and the token reader each include separate and cooperating communication circuits configured to implement a Near Field Communication (NFC) protocol, and wherein the token reader is operable to obtain the access control data from the access token via the NFC protocol.

Example 20: The system of any one of examples 12-19, wherein the access control data is retained by the access token as a barcode, wherein the token reader includes a code reader operable to scan the barcode to obtain the access control data from the access token.

Example 21: The system of any one of examples 12-20, wherein the verification data includes a user ID and a password, and wherein the access control system is configured to match the user ID and the password with input provided by a user, and to deny access to the NFT when the input provided by the user fails to match the user ID and password.

Example 22: The system of example any one of examples 12-21, wherein the verification data includes purchase data specific to an NFT purchase of the NFT specified by the NFT identifier, the access control system is operable to access transactional data stored in the access control database that is specific to the NFT purchase, the access control system is configured to compare the purchase data with the transactional data; and wherein the access control system is configured to deny access to the NFT when the purchase data does not match the transactional data for the NFT specified by the NFT identifier.

Example 23: The system of any one of examples 12-22, wherein the verification data includes geolocation data defining a specified area. The token reader is configured to access a location finding system to determine a location of the token reader; and wherein the access control system is configured to deny access to the NFT when location of the token reader is outside the specified area.

Example 24: The system of any one of examples 12-23, wherein the NFT database includes a distributed ledger that retains one or more NFTs.

Example 25: A method comprising obtaining an NFT identifier for a Non-Fungible Token (NFT) using a computer, wherein the identifier uniquely identifies an NFT stored in an NFT database; authenticating the NFT using an authenticating computer, wherein the authenticating computer uses verification data and the NFT identifier to authenticate the NFT, wherein the verification data includes transactional data about an NFT purchase of the NFT, and access control data specifying at least one user who is permitted access to the NFT, and wherein the verification data and the NFT identifier are compared to access control data in an access control database; and binding the NFT to a access token when the verification data and the NFT identifier match the access control data, wherein the access token is configured to retain at least a portion of the verification data, and the NFT identifier.

Example 26: The method of example 25, wherein authenticating the NFT includes accepting input from a user using a computing device.

Example 27: The method of any one of examples 25-14, wherein authenticating the NFT is performed automatically by a computer, and wherein the computer automatically provides the verification data which includes user specific information identifying a user that is retained by the computer.

Example 28: The method of any one of examples 25-15, wherein the transactional data about the purchase of the NFT is obtained from an NFT marketplace accessible via a computer network.

Example 29: The method of any one of examples 25-16, wherein the NFT is not bound to the access token if authentication is unsuccessful.

Example 30: The method of any one of examples 25-17, comprising generating an access key using the authenticating computer, wherein the access key incorporates at least a portion of the NFT identifier, and at least a portion of the verification data. Binding the NFT to the access token includes applying the access key to the access token.

Example 31: The method of any one of examples 25-18, comprising storing the access key in the authentication database as part of the access control data. Authenticating the NFT includes using the authenticating computer to compare the access key in the authentication database with an access key presented to the authenticating database.

Example 32: The method of any one of examples 25-19, wherein the NFT is stored on a distributed ledger.

Example 33: A method comprising: using a token reader to obtain verification data and an NFT identifier from an access token that is specific to an NFT, wherein the verification data includes transactional data about an NFT purchase of the NFT and access control data specifying at least one user who is permitted access to the NFT; authenticating the verification data and the NFT identifier received from the access token using an authentication module executed by an authenticating computer, wherein the verification data and the NFT identifier are compared to access control data in an access control database to determine if the NFT is accessible, and wherein the authentication module is responsive to the token reader via a computer network; and obtaining a digital asset specific to the NFT via a computer network using a computer when the access control data and the verification data match, wherein the digital asset is accessible via the computer network.

Example 34: The method of example 33, comprising: presenting the digital asset using an output device of the computer.

Example 35: The method of any one of examples 33-34, comprising: retrieving the NFT from an NFT database accessible via the computer network. The NFT includes a Universal Resource Indicator (URI) specifying a location where the digital asset may be obtained.

Example 36: The method of any one of examples 33-35, wherein the NFT database includes a distributed ledger that is configured to retain multiple NFTs, one of which is the NFT identified by the access token.

Example 37: The method of any one of examples 33-36, wherein obtaining the verification data from the access token comprises: activating a scanner configured to read a barcode, wherein the verification data and the NFT identifier are retained by the access token as part of a barcode.

Example 38: The method of any one of examples 33-37, wherein obtaining the verification data from the access token comprises: accepting input from a user using the token reader, wherein the token reader includes an input device for accepting the input; using the input from the user to obtain transactional information about the NFT from a third party via the computer network.

Example 39: The method of any one of examples 33-38: wherein obtaining the verification data from the access token comprises: obtaining a first access key from the access token using the token reader, wherein the first access key incorporates at least a portion of the NFT identifier, and at least a portion of the verification data; and wherein authenticating the verification data from the access token comprises: comparing a second access key from the access control data obtained from the access control database with the first access key obtained from the access token and granting access to the NFT identified by the NFT identifier when the first and second access keys match.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90". The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example, if the stated value is 4.375, then use of the term "about 4.375" generally means a range between 3.9375 and 4.8125.

"Access Token" generally refers to a physical device carrying identifying information for providing access to a resource. In one example, an access token may include one-way or two-way communication capabilities via a wired or wireless communication link. An access token may optionally include a receiver, a transmitter, and/or an antenna such as in the case of a Near Field Communication (NFC), WiFi, Bluetooth, or other such wireless device. In another aspect, an access token may include a memory useful for storing identifying information, such as a user ID, password, public/private key, biometric data about the owner of the token, and the like. An access token may optionally retain other access related information such as a Universal Resource Indicator (URI), an IP address, domain, host name, or other network specific information, or any combination thereof.

"Activate" generally is synonymous with "providing power to", or refers to "enabling a specific function" of a circuit or electronic device that already has power.

"And/or" is inclusive here, meaning "and" as well as "or". For example, "P and/or Q" encompasses, P, Q, and P with Q; and, such "P and/or Q" may include other elements as well.

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Barcode" generally refers to a visible arrangement of shapes, colors, lines, dots, or symbols fixed in some medium and arranged on the medium in a pattern configured to encode data. Examples include optical machine-readable representations of data relating to an object to which the barcode is attached such as a Universal Product Code (UPC), or any visible patterns related to any type of Automatic Identification and Data Capture (AIDC) system. Another example of a barcode is a Quick Response Code (QR Code) which arranges various light and dark shapes to encode data.

Any suitable medium is envisioned. Examples include an adhesive label, a physical page, a display device configured to display the barcode, or any other object such as a box, a statute, a machine, or other physical structure to which the barcode is affixed or upon which it is printed. For example, a bar code may be etched into metal, machined into plastic, or formed by organizing visible three-dimensional shapes into a pattern.

The barcode may not be visible to humans but may be fixed using a substance or device that allows the barcode to be visible to sensors in a machine configured to read wavelengths of light outside those detectable by the human eye. Examples of this type of barcode include barcodes printed with ink that is only visible under ultraviolet (i.e. "black") light, or barcodes displayed using infrared light.

"Battery" generally refers to an electrical energy storage device or storage system including multiple energy storage devices. A battery may include one or more separate electrochemical cells, each converting stored chemical energy into electrical energy by a chemical reaction to generate an electromotive force (or "EMF" measured in Volts). An individual battery cell may have a positive terminal (cathode) with a higher electrical potential, and a negative terminal (anode) that is at a lower electrical potential than the cathode. Any suitable electrochemical cell may be used that employ any suitable chemical process, including galvanic cells, electrolytic cells, fuel cells, flow cells and voltaic piles. When a battery is connected to an external circuit, electrolytes are able to move as ions within the battery, allowing the chemical reactions to be completed at the separate terminals thus delivering energy to the external circuit.

A battery may be a "primary" battery that can produce current immediately upon assembly. Examples of this type include alkaline batteries, nickel oxyhydroxide, lithium-copper, lithium-manganese, lithium-iron, lithium-carbon, lithium-thionyl chloride, mercury oxide, magnesium, zinc-air, zinc-chloride, or zinc-carbon batteries. Such batteries are often referred to as "disposable" insofar as they are generally not rechargeable and are discarded or recycled after discharge.

A battery may also be a "secondary" or "rechargeable" battery that can produce little or no current until charged. Examples of this type include lead-acid batteries, valve regulated lead-acid batteries, sealed gel-cell batteries, and various "dry cell" batteries such as nickel-cadmium (Ni-Cad), nickel-zinc (NiZn), nickel metal hydride (NiMH), and lithium-ion (Li-ion) batteries.

"Blockchain" generally refers to a type of database that includes data arranged in independent collections, groups, or sets which may be referred to as "blocks". Blocks may have predetermined storage capacities and, when a block is filled to capacity, a new block may be created and linked to a previously filled block, forming a chain of related blocks that may be collectively referred to as a "blockchain." As new information is added, new blocks are formed and added to the chain.

In another aspect, a blockchain may create an irreversible timeline of data. When a block is filled, it may be permanently added to the chain in the order the data is received, and each block, and/or each data entry in the block, may receive a timestamp. Thus, each addition to the chain may be viewed as a timeline providing a temporal aspect to the database.

In another aspect, a blockchain may be replicated, shared, and synchronized data geographically across multiple computers such as on a peer-to-peer network. In this configuration, a blockchain may be configured to require global consensus across all participating computers to validate new data added to the blockchain. Other aspects may include an access control layer that governs who can access the blockchain, who can introduce changes, and policies by which those changes are made permanent. Examples of blockchain databases include, but are not limited to, Bitcoin, Ethereum, Flow, Cardano, Polkadot, Litecoin, Bitcoin Cash, Monero, and others.

"Camera" generally refers to an apparatus or assembly that records images of a viewing area or field-of-view on a medium or in a memory. The images may be still images comprising a single frame or snapshot of the viewing area, or a series of frames recorded over a period of time that may be displayed in sequence to create the appearance of a moving image. Any suitable media may be used to store, reproduce, record, or otherwise maintain the images.

"Controller" or "control circuit" generally refers to a mechanical or electronic device configured to control the behavior of another mechanical or electronic device. A controller or "control circuit" is optionally configured to provide signals or other electrical impulses that may be received and interpreted by the controlled device to indicate how it should behave.

"Communication Link" generally refers to a connection between two or more communicating entities and may or may not include a communications channel between the communicating entities. The communication between communicating entities may occur by any suitable means. For example, the connection may be implemented as an actual physical link, an electrical link, an electromagnetic link, a logical link, or any other suitable linkage facilitating communication.

In the case of an actual physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum.

A communication link may include any suitable combination of hardware which may include software components as well. Such hardware may include routers, switches, networking endpoints, repeaters, signal strength enters, hubs, and the like.

In the case of a logical link, the communication link may be a conceptual linkage between the sender and recipient such as a transmission station in the receiving station. Logical link may include any combination of physical, electrical, electromagnetic, or other types of communication links.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus, a computer may include one or more physical processors or other computing devices or circuitry and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data).

In another aspect, the DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS.

In another aspect, a database may implement "smart contracts" which include rules written in computer code that automatically execute specific actions when predetermined conditions have been met and verified. Examples of such actions include, but are not limited to, releasing funds to the appropriate parties, registering a vehicle, sending notifications, issuing a certificate of ownership transfer, and the like. The database may then be updated when the transactions specified in the rules encoded in the smart contract are completely executed. In another aspect, the transaction specified in the rolls may be irreversible and automatically executed without the possibility of manual intervention. In another aspect, only parties specified in the rules of the smart contract who have been granted permission may be notified or allowed to see the results.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, chained model (such as in the case of a "blockchain" database), the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Washington, USA; MySQL and various versions of the Oracle DBMS, often referred to as simply "Oracle" both separately offered by the Oracle Corporation of Redwood City, California, USA; the DBMS generally referred to as "SAP" provided by SAP SE of Walldorf, Germany; and the DB2 DBMS provided by the International Business Machines Corporation (IBM) of Armonk, New York, USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Digital Asset" generally refers to an entity that exists in a digital format. The entity may include accompanying rights such as a right to access, view, edit, display, and the like. Examples of digital assets include digital documents, audible content, motion picture, photographs, logos, animations, illustrations, spreadsheets, and the like.

"File" generally refers to a collection of data stored as a unit that is identifiable by the computer as a separate entity distinguishable from other files or resources. A file may be identifiable by means of a "file name" or other unique identifying features such as its location in a "file system" useful for organizing and locating files.

A file may be designated to store data of a particular type such as an image, an email or SMS message, a video, an executable computer program, or any of a wide array of other kinds of data, or any combination thereof. For example, a file may store a digital asset or an NFT. A file optionally enables a user to open, read, change, edit, save, and/or view the contents of the file. Viewing and editing the contents may be enabled by use of an executable program running on a computer such as in the case of a document editor or image viewer program.

"Distributed Ledger" generally refers to a database of transactional information that is shared across multiple computing devices. In one example, transactions on the ledger are publicly available for anyone to access and analyze. In another example, transactions may be encrypted thus controlling access to the details of the transaction and optionally limiting it to only those with the proper credentials.

In another aspect, all computing devices may synchronize and share a single copy of the ledger, or a portion thereof, and may be configured to conform to a predetermined protocol by which changes made to the ledger are made and distributed to all participants. Such distribution of changes may be required by the protocol in order to verify that the changes to the ledger are accepted by all participating computers. Commonly available examples of distributed ledgers may be found in distributed blockchain databases such as are used for cryptocurrencies like Bitcoin, Ethereum, Cardano, Polkadot, Litecoin, Bitcoin Cash, Monero, and others. Where blockchain databases are employed for distributed ledger functionality, the distributed ledger may be optionally referred to as a "blockchain ledger."

"Display device" generally refers to any device capable of being controlled by an electronic circuit or processor to display information in a visual or tactile. A display device may be configured as an input device taking input from a user or other system (e.g. a touch sensitive computer screen), or as an output device generating visual or tactile information, or the display device may configured to operate as both an input or output device at the same time, or at different times.

The output may be two-dimensional, three-dimensional, and/or mechanical displays and includes, but is not limited to, the following display technologies: Cathode ray tube display (CRT), Light-emitting diode display (LED), Electroluminescent display (ELD), Electronic paper, Electrophoretic Ink (E-ink), Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, an array of red, yellow, and green indicators configured to indicate a temperature range.

"Electrically connected" generally refers to a configuration of two objects that allows electricity to flow between them or through them. In one example, two conductive materials are physically adjacent one another and are sufficiently close together so that electricity can pass between them. In another example, two conductive materials are in physical contact allowing electricity to flow between them.

"Input Device" generally refers to any device coupled to a computer that is configured to receive input and deliver the input to a processor, memory, or other part of the computer. Such input devices can include keyboards, mice, trackballs, touch sensitive pointing devices such as touchpads, or touchscreens. Input devices also include any sensor or sensor array for detecting environmental conditions such as temperature, light, noise, vibration, humidity, and the like.

"Location Finding System" generally refers to a system that tracks the location of objects or people in real time. Such systems include space-based systems like the Global Positioning System (GPS) which may use a receiver on earth in communication with multiple satellite mounted transmitters in space. Such systems may use time and the known position of the satellites to triangulate a position on earth. The satellites may include accurate clocks that are synchronized to each other and to ground clocks. The satellites may be configured to continuously transmit their current time and position. The ground-based receiver may monitor multiple satellites solving equations in real time to determine the precise position of the receiver. Signals from four satellites may be required for a receiver to make the necessary computations.

In another example sometimes referred to as "Real-time Locating Systems" (RTLS), wireless tags are attached to objects or worn by people. Receivers maintained at known, fixed reference points may receive wireless signals from the tags and use signal strength information to determine their location.

The tags may communicate using electromagnetic energy which may include radio frequency (RF) communication, optical, and/or acoustic technology instead of or in addition to RF communication. Tags and fixed reference points can be transmitters, receivers, or both. Location information may or may not include speed, direction, or spatial orientation, and may in some cases be limited to tracking locations of objects within a building or contained area.

Wireless networking equipment may be engaged as well. In one example, known signal strength readings may be taken in different locations serviced by a wireless network such as in 802.11 Wi-Fi network. These known signal strength readings may be used to calculate or triangulate approximate locations by comparing measured signal strength received from a tag against a stored database of Wi-Fi readings or Received Signal Strength Indicators (RSSI). In this way, one or more probable locations may be indicated a virtual map.

In another example, a wireless network transmitter may be configured to send reference signal strength information in packets or datagrams received by the tags. The tags may be configured to measure and/or calculate the actual signal strength of the signal received from the sending transmitter and compare this actual signal strength to reference signal strength information to determine an approximate distance from the transmitter. This distance information may then be sent to other servers or components in the location finding system and used to triangulate a more precise location for a given tag.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Module" or "Engine" generally refers to a collection of computational or logic circuits implemented in hardware, or to a series of logic or computational instructions expressed in executable, object, or source code, or any combination thereof, configured to perform tasks or implement processes. A module may be implemented in software maintained in volatile memory in a computer and executed by a processor or other circuit. A module may be implemented as software stored in an erasable/programmable nonvolatile memory and executed by a processor or processors. A module may be implanted as software coded into an Application Specific Information Integrated Circuit (ASIC). A module may be a collection of digital or analog circuits configured to control a machine to generate a desired outcome.

Modules may be executed on a single computer with one or more processors, or by multiple computers with multiple processors coupled together by a network. Separate aspects, computations, or functionality performed by a module may be executed by separate processors on separate computers, by the same processor on the same computer, or by different computers at different times.

"Multiple" as used herein is synonymous with the term "plurality" and refers to more than one, or by extension, two or more.

"Near Field Communication (NFC)" generally refers to a communication protocol for communication between two electronic devices. Generally, NFC is a technology used for contactless exchange of data over a short distance. In one example, NFC communications optionally take place wirelessly between a transmitter and receiver positioned at a distance of less than 10 cm, or optionally less than 4 cm.

NFC optionally involves an initiator and a target. The initiator may actively generate an electromagnetic field that can power a passive target. In another aspect, NFC targets may be unpowered tags, stickers, key fobs, or cards that are activated by the radio frequency energy delivered from the initiator. In another aspect, NFC may be useful for peer-to-peer communication such as in the case where both the initiator and the target are powered devices and are configured with circuits capable of establishing a two-way communications link.

In another aspect, an NFC target may contain data and may be "read-only." In another aspect, the NFC target may be writable as well. The target may be configured to encrypt or obfuscate data so as to securely store data. Such data may include personally identifiable information, debit and credit card information, loyalty program data, passwords, PINs, or other access credentials, and the like.

In the case of NFC enabled proximity card technology, NFC may use inductive coupling between two nearby loop antennas effectively forming an air-core transformer. Because the distances involved are small compared to the wavelength of electromagnetic radiation (radio waves) of that frequency (about 22 meters), the interaction is described as near field. In one aspect, only an alternating magnetic field may be used so that only a small amount of power is actually radiated in the form of radio waves (which are electromagnetic waves, also involving an oscillating electric field). This may prevent interference between such devices and other radio communications at the same frequency or with other NFC devices much beyond its intended range.

In another aspect, NFC devices may operate within the globally available and unlicensed radio frequency ISM band of 13.56 MHz. For example, most of the RF energy may be concentrated in the ±7 kHz bandwidth allocated for that band, but the emission's spectral width may be as wide as 1.8 MHz. This may be advantageous for supporting higher data rates.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a low power wireless Personal Area Network using IPv6 (6LoWPAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"NFT access device" generally refers to a physical device that is configured to allow a user to experience an NFT. For example, where the item associated with the NFT is a file that contains an audio recording, the NFT access device includes an audio output device for playing the file as audible sound. In another example, where the item associated with the NFT is a file that contains a movie or image, the NFT access device optionally includes, or is configured to use, a display device and related circuitry for displaying the movie or image file.

"Non-Fungible Token (NFT)" generally refers to a unit of data that may be stored on a digital ledger, such as a blockchain, that certifies a digital asset to be unique and therefore not interchangeable (hence the use of the term "non-fungible"). NFTs can be associated with any digital item, examples of which include photos, videos, audio files, and the like. Access to copies of the original file may not be restricted to the buyer of the NFT, but only one entity can own the original, and it is proof of ownership of the original that the NFT provides. In one example, NFTs may be publicly available and obtainable by anyone with access to them, such as in the case of NFTs stored on a publicly accessible distributed digital ledger. In another example, NFTs may be maintained privately with limited and controlled access.

"Optionally" as used herein means discretionary; not required; possible, but not compulsory; left to personal choice.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projector a projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Personal computing device" generally refers to a computing device configured for use by individual people. Examples include mobile devices such as Personal Digital Assistants (PDAs), tablet computers, wearable computers installed in items worn on the human body such as in eyeglasses, watches, laptop computers, portable music/video players, computers in automobiles, or cellular telephones such as smart phones. Personal computing devices can be devices that are typically not mobile such as desk top computers, game consoles, or server computers. Personal computing devices may include any suitable input/output devices and may be configured to access a network such as through a wireless or wired connection, and/or via other network hardware.

"Portion" means a part of a whole, either separated from or integrated with it.

"Predominately" as used herein is synonymous with greater than 50%.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, California, USA. Other examples of commercially available processors include but are not limited to the X8 and Freescale Coldfire processors made by Motorola Corporation of Schaumburg, Illinois, USA; the ARM processor and TEGRA System on a Chip (SoC) processors manufactured by Nvidia of Santa Clara, California, USA; the POWER7 processor manufactured by International Business Machines of White Plains, New York, USA; any of the FX, Phenom, Athlon, Sempron, or Opteron processors manufactured by Advanced Micro Devices of Sunnyvale, California, USA; or the Snapdragon SoC processors manufactured by Qualcomm of San Diego, California, USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiver" generally refers to a device configured to receive, for example, digital or analog signals carrying information via electromagnetic energy. A receiver using electromagnetic energy may operate with an antenna or antenna system to intercept electromagnetic waves passing through a medium such as air, a conductor such as a metallic cable, or through glass fibers. A receiver can be a separate piece of electronic equipment, or an electrical circuit within another electronic device. A receiver and a transmitter combined in one unit are called a "transceiver".

A receiver may use electronic circuits configured to filter or separate one or more desired radio frequency signals from all the other signals received by the antenna, an electronic amplifier to increase the power of the signal for further processing, and circuits configured to demodulate the information received.

Examples of the information received include sound (an audio signal), images (a video signal) or data (a digital signal). Devices that contain radio receivers include television sets, radar equipment, two-way radios, cell phones and other cellular devices, wireless computer networks, GPS navigation devices, radio telescopes, Bluetooth enabled devices, garage door openers, and/or baby monitors.

"Resource Identifier (URI)" generally refers to a string of characters or other data used to identify a resource. A resource identifier may be thought of as a locator, a name, or both and need not conform to any particular convention. For example, a random string of data bits or characters, a machine generated hash code, a telephone number, a "mailto" tag with an address, a Uniform Resource Identifier (URI), a Uniform Resource Locator (URL), or any combination thereof my operate as resource identifiers. A resource identifier may be "uniform" in that it may conform to a preexisting standard (such as in the case of a URI), but such a uniform nature is not required. A resource identifier need only be recognizable at least to the system making the resource available and be usable by the system requesting the resource.

Examples include representations of a resource using specific protocols over a network, such as the World Wide Web. In this context, resource identifier such as a URI may conform to a specific standard specifying a concrete syntax and associated protocols. The most common form of resource identifier is the Uniform Resource Locator (URL), frequently referred to informally as a web address. More rarely seen in usage is the Uniform Resource Name (URN), which was designed to complement URLs by providing a mechanism for the identification of resources in particular namespaces.

The term "Uniform Resource Locator" (URL) refers to the subset of URIs that, in addition to identifying a resource, define a specific means of locating the resource by describing its primary access mechanism (e.g., its network "location"). The term "Uniform Resource Name" (URN) has been used historically to refer to both URIs under the "urn" scheme, which are required to remain globally unique and persistent even when the resource ceases to exist or becomes unavailable, and to any other URI with the properties of a name.

For example, a URI may conform to The Internet Engineering Task Force (IETF) RFC 2396 entitled "Uniform Resource Identifiers (URI): Generic Syntax." In this case, the URI would at least conform to the following format:

scheme:[//[user[:password]@]host[:port]][/path][?query] [#fragment]

"Scheme" generally refers to a sequence of characters beginning with a letter and followed by any combination of letters, digits, plus sign, period, or hyphen. The scheme is followed by a colon. Examples of popular schemes include http, https, ftp, mailto, file, data, and IRC. Most URI schemes are standardized and registered with the Internet Assigned Numbers Authority (IANA), although non-registered schemes are used in practice. The two slashes (e.g. "//") are required by some schemes and not required by some others. When the authority component is absent, the path component cannot begin with two slashes.

"User" and "password" generally refers to optional components of a URI that together form an "authentication section" that if present, is followed by an "at" symbol (an "Host" generally refers to either a registered name (including but not limited to a hostname), or an IP address. IPv4 addresses are represented in dot-decimal notation, and IPv6 addresses are enclosed in square brackets ("[ ]").

"Port number" generally refers to an identifier specifying a process to which a network message is to be forwarded when it arrives at a host. It is optional in a URI, and if present, is separated from the hostname by a colon.

"Path" generally refers to location data specifying where to find the requested resource on the host. A path is usually organized in hierarchical form like a file system path with elements indicating nodes in a tree structure, the elements separated by a delimiter such as a slash. The path may map mirror the host file system, or a portion thereof, but this is only one implementation of the path concept and is not required. Thus a path may be any suitable string of characters. The path begins with a single slash (/) if an authority part was present, and may also if one was not, but cannot begin with a double slash. The path is always defined, though the defined path may be empty (zero length).

"Query" generally refers to an optional portion that is separated from the preceding part of the URI by a question mark. The query includes a string of characters representing data available to the recipient host. Any suitable string of characters may follow the question mark. By convention, the string is commonly a sequence of attribute-value pairs separated by a delimiter such as an ampersand sign (an "&"). For example "?type=car&name=mustang" includes two key/value pairs where the keys are "type" and "name" respectively, and the corresponding values are "car" and "mustang", both pairs separated by an ampersand character.

"Fragment" generally refers to an optional portion that is separated from the preceding part by a hash symbol (a "#"). The fragment includes an identifier providing additional input to a secondary resource, such as a section heading in an article identified by the remainder of the URI. When the primary resource is an HTML document, the fragment is often an id attribute of a specific element, and web browsers commonly automatically scroll the page until this element is in view.

"Retain" generally refers to the act of keeping possession or use of something; the act of remembering by keeping in mind or memory, such as in the context of storing in a computer memory whether in volatile, nonvolatile, or other memory; or to hold one object secure or intact relative to another such as in the physical sense via a fastening member or material.

"Uniform Resource Locator (URL)" generally refers to a reference to a web resource that specifies the location of the resource on a computer network and a mechanism for retrieving it. A URL is an example of, or type of, Uniform Resource Identifier (URI) that identifies a resource by a standard representation of its primary access mechanism (e.g., its network "location"), rather than by some other attribute. URLs occur most commonly to reference web pages (http), but are also used for file transfer (ftp), email (mailto), database access (JDBC), and many other applications. A URL is sometimes informally referred to as a "web address".

"Rule" generally refers to a conditional statement with at least two outcomes. A rule may be compared to available data which can yield a positive result (all aspects of the conditional statement of the rule are satisfied by the data), or a negative result (at least one aspect of the conditional statement of the rule is not satisfied by the data). One example of a rule is shown below as pseudo code of an "if/then/else" statement that may be coded in a programming language and executed by a processor in a computer:

```
if (clouds.areGrey( ) and
(clouds.numberOfClouds>100)) then {
    prepare for rain;
} else {
    Prepare for sunshine;
}
```

"Signal" generally refers to a function or means of representing information. It may be thought of as the output of a transformation or encoding process. The concept generally includes a change in the state of a medium or carrier that conveys the information. The medium can be any suitable medium such as air, water, electricity, magnetism, or electromagnetic energy such as in the case of radio waves, pulses of visible or invisible light, and the like.

As used herein, a "signal" implies a representation of meaningful information. Arbitrary or random changes in the state of a carrier medium are generally not considered "signals" and may be considered "noise". For example, arbitrary binary data streams are not considered as signals. On the other hand, analog and digital signals that are representations of analog physical quantities are examples of signals. A signal is commonly not useful without some way to transmit or send the information, and a receiver responsive to the transmitter for receiving the information.

In a communication system, for example, a transmitter encodes a message to a signal, which is carried to a receiver by the communications channel. For example, the words "The time is 12 o'clock" might be the message spoken into a telephone. The telephone transmitter may then convert the sounds into an electrical voltage signal. The signal is transmitted to the receiving telephone by wires, at the receiver it is reconverted into sounds.

Signals may be thought of as "discrete" or "continuous." Discrete-time signals are often referred to as time series in other fields. Continuous-time signals are often referred to as continuous signals even when the signal functions are not continuous, such as in a square-wave signal.

Another categorization is signals which are "discrete-valued" and "continuous-valued". Particularly in digital signal processing a digital signal is sometimes defined as a sequence of discrete values, that may or may not be derived from an underlying continuous-valued physical process. In other contexts, digital signals are defined as the continuous-time waveform signals in a digital system, representing a bit-stream. In the first case, a signal that is generated by means of a digital modulation method may be considered as converted to an analog signal, while it may be considered as a digital signal in the second case.

"Smart Contract" generally refers to a self-executing contract where the terms and conditions of the agreement between the parties are memorialized as lines of code (and optionally, as text on a page in the classic contract sense). The code and the agreements contained therein may exist in a distributed database such as in a decentralized blockchain ledger. In this example the code of the smart contract may be configured to automatically execute one or more transactions according to the terms of the smart contract that are stored on the ledger thus making the transactions publicly trackable and irreversible. Smart contracts are an example of self-executing agreements carried out among sometimes anonymous parties without the need for a central authority, legal system, or external enforcement mechanism.

"Short Message Service (SMS)" generally refers to a text messaging service component of phone, Web, or mobile communication systems. It uses standardized communications protocols to allow fixed line or mobile phone devices to exchange short text messages. Transmission of short messages between a Short Message Service Center (SMSC) and personal computing device is done whenever using the Mobile Application Part (MAP) of the SS7 protocol. Messages payloads may be limited by the constraints of the signaling protocol to precisely 140 octets (140 octets*8 bits/octet=1120 bits). Short messages can be encoded using a variety of alphabets: the default GSM 7-bit alphabet, the 8-bit data alphabet, and the 16-bit UCS-2 alphabet. Depending on which alphabet the subscriber has configured in the handset, this leads to the maximum individual short message sizes of 160 7-bit characters, 140 8-bit characters, or 70 16-bit characters.

"Superimpose" generally refers to positioning one thing over, or in front of, another so that both are still at least somewhat evident. In one example, images may be layered in an ordered fashion such that when presented or displayed, earlier images appear behind later applied images. In another example, images or objects that are at least partially transparent may be positioned in front of one another, such as in the case of a still or moving image of a virtual world where a background image may have a foreground imaged positioned in the viewing plane so that it appears in front of or above the background image. Images positioned in this manner may be partially transparent such that portions of the background imagery may be apparent within the bounds of the foreground image.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

Information such as a signal provided to the transmitter may be encoded or modulated by the transmitter using various digital or analog circuits. The information may then be transmitted. Examples of such information include sound (an audio signal), images (a video signal) or data (a digital signal). Devices that contain radio transmitters include radar equipment, two-way radios, cell phones and other cellular devices, wireless computer networks and network devices, GPS navigation devices, radio telescopes, Radio Frequency Identification (RFID) chips, Bluetooth enabled devices, and garage door openers.

"Transmitter" generally refers to a device configured to transmit, for example, digital or analog signals carrying information via electromagnetic energy. A transmitter using electromagnetic energy may operate with an antenna or antenna system to produce electromagnetic waves passing through a medium such as air, a conductor such as a metallic cable, or through glass fibers. A transmitter can be a separate piece of electronic equipment, or an electrical circuit within another electronic device. A transmitter and a receiver combined in one unit are called a "transceiver".

"Triggering a Rule" generally refers to an outcome that follows when all elements of a conditional statement expressed in a rule are satisfied. In this context, a conditional statement may result in either a positive result (all conditions of the rule are satisfied by the data), or a negative result (at least one of the conditions of the rule is not satisfied by the data) when compared to available data. The conditions expressed in the rule are triggered if all conditions are met causing program execution to proceed along a different path than if the rule is not triggered.

"Viewing Area", "Field of View", or "Field of Vision" is the extent of the observable world that is seen at any given moment. In case of optical instruments, cameras, or sensors, it is a solid angle through which a detector is sensitive to electromagnetic radiation that includes light visible to the human eye, and any other form of electromagnetic radiation that may be invisible to humans.

What is claimed is:

1. A system, comprising:
    physical access token comprising a first communication circuit including a transmitter circuit and configured to retain a first set of access control data for a Non-Fungible Token (NFT), wherein the first set of access control data comprises (i) an NFT identifier for uniquely identifying the NFT and (ii) verification data specific to the NFT identifier;
    an access control system comprising one or more computers, the access control system configured to compare the verification data obtained from the physical access token with a second set of access control data, the second set of access control data maintained in an access control database accessible by the access control system, wherein the access control system is configured to deny access to the NFT when the verification data obtained from the physical access token does not match the second set of access control data in the access control database for the NFT identified by the NFT identifier;
    a token reader comprising a second communication circuit including a receiver circuit, wherein the token reader is configured to:
        obtain, via the receiver circuit, the first set of access control data from the physical access token via a wireless radio communication from the transmitter circuit, wherein the first and second communication circuits are configured to implement at least one wireless communication protocol selected from a group of: a Near Field Communication (NFC) protocol, a Wi-Fi protocol, or a Bluetooth protocol to implement the wireless radio communication, and
        transmit, via a computer network, the first set of access control data to the access control system, to provide access to the NFT from an NFT database;
    an output device configured to present a digital asset associated with the NFT responsive to the access control system (i) granting access to the NFT based on the comparison of the verification data and the second set of access control data and (ii) causing transmission of the digital asset for presentation by the output device, wherein the output device includes a display device, and the digital asset associated with the NFT defines one or more images for display on the display device, and a camera operable to capture one or more images of objects within a capture area defined by the camera, wherein the output device is configured to display the one or more images captured by the camera;

wherein an NFT access device that includes the output device is configured to combine the one or more images of the digital asset associated with the NFT with the one or more images captured by the camera to create a combined visual presentation; and wherein the output device is operable to display the combined visual presentation.

2. The system of claim 1:
wherein the NFT access device further includes the token reader and a network interface,
wherein the NFT access device is configured to:
use the token reader to obtain the first set of access control data from the physical access token, wherein the NFT access device is configured to engage the access control system via the computer network to determine if the NFT access device is allowed access to the NFT identified by the NFT identifier obtained from the physical access token,
receive, via the network interface and the computer network, the digital asset responsive to the access control system (i) granting access to the NFT based on the comparison of the verification data and the second set of access control data and (ii) causing transmission of the digital asset for presentation by the output device, and
control the output device to present the digital asset.

3. The system of claim 2, wherein the digital asset defines an NFT video, wherein the one or more images captured by the camera defines a background video, and wherein the combined visual presentation includes the NFT video superimposed over the background video.

4. The system of claim 2, wherein the output device includes an audio output device, and the digital asset associated with the NFT includes data defining sounds that are playable using the audio output device.

5. The system of claim 1, wherein a third set of access control data is retained by a second physical access token as a barcode, wherein the token reader includes a code reader operable to scan the barcode to obtain the third set of access control data from the second physical access token, and wherein the token reader is further configured to transmit, via a computer network, the third set of access control data to the access control system, to provide access to another NFT from an NFT database.

6. The system of claim 1, wherein the verification data includes a user ID and a password, and wherein the access control system is configured to match the user ID and the password with input provided by a user, and to deny access to the NFT when the input provided by the user fails to match the user ID and password.

7. The system of claim 1:
wherein the verification data includes purchase data specific to an NFT purchase of the NFT specified by the NFT identifier;
wherein the access control system is operable to access transactional data stored in the access control database that is specific to the NFT purchase;
wherein the access control system is configured to compare the purchase data with the transactional data; and
wherein the access control system is configured to deny access to the NFT when the purchase data does not match the transactional data for the NFT specified by the NFT identifier.

8. The system of claim 1:
wherein the verification data includes geolocation data defining a specified area;
wherein the token reader is configured to access a location finding system to determine a location of the token reader; and
wherein the access control system is configured to deny access to the NFT when the location of the token reader is outside the specified area.

9. The system of claim 1, wherein the NFT database includes a distributed ledger that retains one or more NFTs including the NFT.

10. A method comprising:
obtaining, by a computer, first access control data including a non-fungible token (NFT) identifier and verification data, wherein the NFT identifier uniquely identifies an NFT stored in an NFT database and the verification data includes transactional data about an NFT purchase of the NFT and user identification data identifying a user;
transmitting, by the computer via a computer network, the first access control data to initiate authentication of the NFT using an access control system, wherein, to authenticate the NFT, the access control system compares the verification data and the NFT identifier to a second set of access control data in an access control database;
binding the NFT to a physical access token in response to the access control system determining that the verification data and the NFT identifier match the second set of access control data, wherein the physical access token is configured to retain a third set of access control data comprising at least a portion of the verification data and the NFT identifier, and wherein the physical access token includes a first communication circuit including a transmitter circuit and the first communication circuit is configured to transmit the third set of access control data via the first communication circuit using at least one wireless communication protocol selected from a group of: a Near Field Communication (NFC) protocol, a Wi-Fi protocol, or a Bluetooth protocol;
obtaining, wirelessly via a token reader of an NFT access device, the third set of access control data from the physical access token;
transmitting, by the NFT access device, the third set of access control data to the access control system to initiate authentication of the verification data and the NFT identifier;
capturing, via a camera of the NFT access device, one or more images of objects within a capture area defined by the camera;
receiving, by the NFT access device wirelessly via a receiver circuit of the NFT access device using a wireless communication protocol, a digital asset specific to the NFT when the second set of access control data and the verification data match, the digital asset defining one or more images for display;
combining the one or more images of the digital asset associated with the NFT with the one or more images captured by the camera to create a combined visual presentation; and presenting, by an output device of the NFT access device, the combined visual presentation, wherein the output device includes a display device and presenting the combined visual presentation includes displaying the combined visual presentation on the display device.

11. The method of claim 10, wherein obtaining the first access control data includes accepting input from a user using a computing device.

12. The method of claim 10, wherein binding the NFT to the physical access token includes:
transmitting, by the computer via a transmitter, the third set of access control data to a receiver of the physical access token, and
storing, in a memory of the physical access token, the third set of access control data.

13. The method of claim 10, wherein the transactional data about the NFT purchase of the NFT is obtained from an NFT marketplace accessible via a computer network.

14. The method of claim 13, comprising:
generating an access key using the access control system, wherein the access key incorporates at least a portion of the NFT identifier, and at least a portion of the verification data;
wherein binding the NFT to the physical access token includes applying the access key to the physical access token.

15. The method of claim 14, comprising:
storing the access key in an authentication database as part of the second set of access control data;
wherein authenticating the NFT includes using the access control system to compare the access key in the authentication database with an access key presented to the authentication database.

16. The method of claim 10, wherein the NFT is not bound to the physical access token if authentication is unsuccessful.

17. The method of claim 10, wherein the NFT is stored on a distributed ledger.

18. A method comprising:
obtaining, wirelessly via a token reader of a nonfungible token (NFT) access device, a first set of access control data from a physical access token that is specific to an NFT, the first set of access control data including verification data and an NFT identifier, wherein the verification data includes transactional data about an NFT purchase of the NFT and user access control data specifying at least one user who is permitted access to the NFT;
transmitting, by the NFT access device via a computer network, the first set of access control data to an access control system to initiate authentication of the verification data and the NFT identifier received from the physical access token using the access control system, wherein the authentication comprises comparing the verification data and the NFT identifier to a second set of access control data in an access control database to determine if the NFT is accessible;
capturing, via a camera of the NFT access device, one or more images of objects within a capture area defined by the camera;
receiving, by the NFT access device wirelessly via a receiver circuit of the NFT access device using a wireless communication protocol, a digital asset specific to the NFT via the computer network when the second set of access control data and the verification data match, the digital asset defining one or more images for display;
combining the one or more images of the digital asset associated with the NFT with the one or more images captured by the camera to create a combined visual presentation; and
presenting, by an output device of the NFT access device, the combined visual presentation, wherein the output device includes a display device and presenting the combined visual presentation includes displaying the combined visual presentation on the display device.

19. The method of claim 18, comprising:
retrieving the NFT from an NFT database accessible via the computer network;
wherein the NFT includes a Universal Resource Indicator (URI) specifying a location where the digital asset may be obtained.

20. The method of claim 19, wherein the NFT database includes a distributed ledger that is configured to retain multiple NFTs, one of which is the NFT identified by the physical access token.

21. The method of claim 18, wherein obtaining the verification data from the physical access token comprises:
reading, via a scanner of the NFT access device, a barcode on the physical access token, wherein the verification data and the NFT identifier are retained by the physical access token as part of the barcode.

22. The method of claim 18, wherein obtaining the verification data from the physical access token comprises:
accepting input from a user using the token reader, wherein the token reader includes an input device for accepting the input;
using the input from the user to obtain transactional information about the NFT from a third party via the computer network.

23. The method of claim 18:
wherein obtaining the verification data from the physical access token comprises:
obtaining a first access key from the physical access token using the token reader, wherein the first access key incorporates at least a portion of the NFT identifier and at least a portion of the verification data; and
wherein authenticating the verification data from the physical access token comprises:
comparing a second access key from the second set of access control data obtained from the access control database with the first access key obtained from the physical access token and granting access to the NFT identified by the NFT identifier when the first and second access keys match.

24. A non-transitory computer readable medium that stores instructions that, when executed by one or more processors, cause the one or more processors to:
obtain, wirelessly via a token reader of a nonfungible token (NFT) access device, a first set of access control data from a physical access token that is specific to an NFT, the first set of access control data including verification data and an NFT identifier, wherein the verification data includes transactional data about an NFT purchase of the NFT and user access control data specifying at least one user who is permitted access to the NFT;
transmit, by the NFT access device via a computer network, the first set of access control data to an access control system to initiate authentication of the verification data and the NFT identifier received from the physical access token using the access control system, wherein the authentication comprises comparing the verification data and the NFT identifier to a second set of access control data in an access control database to determine if the NFT is accessible;

capture, via a camera, one or more images of objects within a capture area defined by the camera;

receive, by the NFT access device wirelessly via a receiver circuit of the NFT access device using a wireless communication protocol, a digital asset specific to the NFT via the computer network when the second set of access control data and the verification data match, the digital asset defining one or more images for display;

combine the one or more images of the digital asset associated with the NFT with the one or more images captured by the camera to create a combined visual presentation using an output device; and present, by the output device of the NFT access device, the digital asset and the combined visual presentation, wherein the output device includes a display device and presenting the combined visual presentation includes displaying the combined visual presentation on the display device.

* * * * *